US010297897B2

(12) United States Patent
Hashimoto et al.

(10) Patent No.: US 10,297,897 B2
(45) Date of Patent: May 21, 2019

(54) GLASS ANTENNA AND VEHICLE WINDOW GLASS PROVIDED WITH GLASS ANTENNA

(71) Applicant: AGC INC., Tokyo (JP)

(72) Inventors: Naoki Hashimoto, Tokyo (JP); Shoichi Takeuchi, Tokyo (JP); Dan Lis, Gosselies (BE)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 15/877,690

(22) Filed: Jan. 23, 2018

(65) Prior Publication Data

US 2018/0151939 A1 May 31, 2018

Related U.S. Application Data

(63) Continuation of application No. PCT/JP2016/071460, filed on Jul. 21, 2016.

(30) Foreign Application Priority Data

Jul. 24, 2015 (JP) .................................. 2015-147254

(51) Int. Cl.
*H01Q 1/12* (2006.01)
*B60J 1/00* (2006.01)
(Continued)

(52) U.S. Cl.
CPC .............. *H01Q 1/1278* (2013.01); *B60J 1/00* (2013.01); *H01Q 1/32* (2013.01); *H01Q 5/10* (2015.01);
(Continued)

(58) Field of Classification Search
CPC ........ H01Q 1/1278; H01Q 5/10; H01Q 5/364; H01Q 1/32; H01Q 13/10; H01Q 21/064; B60J 1/00
See application file for complete search history.

(56) References Cited

U.S. PATENT DOCUMENTS 5,264,858 A 11/1993 Shiina
5,365,242 A 11/1994 Shiina
(Continued)

FOREIGN PATENT DOCUMENTS

EP 1 158 605 A1 11/2001
EP 1 601 044 A2 11/2005
(Continued)

OTHER PUBLICATIONS

International Search Report for PCT/JP2016/071460 dated Sep. 13, 2016.

*Primary Examiner* — Dameon E Levi
*Assistant Examiner* — David E Lotter
(74) *Attorney, Agent, or Firm* — Foley & Lardner LLP

(57) ABSTRACT

A glass antenna arranged on a vehicle window glass includes a slot antenna formed by cutting out a conductive film; and a power supply unit configured to supply power to the slot antenna. The slot antenna includes a first slot extending in a first direction; a second slot connected to one end of the first slot, and extending in a second direction, a first wide-width slot connected to the other end of the first slot directly or via a first connection slot, and having a slot width greater than that of the first slot, and a second wide-width slot connected to a terminal end portion of the second slot directly or via a second connection slot, and having a slot width greater than that of the second slot. The power supply unit is arranged so as to straddle the first slot.

20 Claims, 23 Drawing Sheets

(51) Int. Cl.
  *H01Q 1/32*    (2006.01)
  *H01Q 13/10*   (2006.01)
  *H01Q 5/10*    (2015.01)
  *H01Q 5/364*   (2015.01)
  *H01Q 21/06*   (2006.01)

(52) U.S. Cl.
  CPC ............ *H01Q 5/364* (2015.01); *H01Q 13/10* (2013.01); *H01Q 21/064* (2013.01)

(56) References Cited

U.S. PATENT DOCUMENTS

| | | | |
|---|---|---|---|
| 2003/0164800 A1* | 9/2003 | Jordan | H01Q 1/1271 343/713 |
| 2005/0168389 A1* | 8/2005 | Yuanzhu | H01Q 9/0457 343/767 |
| 2006/0125703 A1 | 6/2006 | Ma et al. | |
| 2011/0057844 A1 | 3/2011 | Watanabe et al. | |
| 2014/0231503 A1 | 8/2014 | Arimura | |
| 2015/0357700 A1 | 12/2015 | Kagaya et al. | |

FOREIGN PATENT DOCUMENTS

| | | |
|---|---|---|
| EP | 2811573 A1 | 12/2014 |
| JP | H06-291530 A | 10/1994 |
| JP | 2001-185928 A | 7/2001 |
| JP | 2003-283230 A | 10/2003 |
| JP | 2005-223879 A | 8/2005 |
| JP | 2008-147750 A | 6/2008 |
| JP | 2009-171017 A | 7/2009 |
| JP | 2011-091780 A | 5/2011 |
| JP | 2012-054915 A | 3/2012 |
| JP | 2012-169896 A | 9/2012 |
| WO | WO-2014/129588 A1 | 8/2014 |

* cited by examiner

GLASS ANTENNA AND VEHICLE WINDOW GLASS PROVIDED WITH GLASS ANTENNA

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/071460 filed on Jul. 21, 2016 and designating the U.S., which claims priority of Japanese Patent Application No. 2015-147254 filed on Jul. 24, 2015. The entire contents of the foregoing applications are incorporated herein by reference.

BACKGROUND OF THE INVENTION

1. Field of the Invention

The disclosure herein generally relates to a glass antenna and a vehicle window glass provided with the glass antenna.

2. Description of the Related Art

Recently, with development of communication technology, a mobile terminal or the like is often brought into a vehicle, to perform communication between the vehicle and the mobile terminal or between the vehicle and the outside.

Moreover, a technology of a vehicle provided with a function of collecting information from outside by itself and of delivering information, termed as a connected car, has been proposed. In a connected car, by performing a two-way communication for data transmitted from the vehicle, such as a vehicle position, a vehicle condition, and a road surface condition and for information collected from outside, such as map information, traffic information and weather information, a telematics service such as traffic congestion moderation or driving support for enhancing an efficiency and safety of the vehicle is provided. Furthermore, the connected car is expected to provide a solution/service or the like as a tool (device) for enhancing convenience for a user such as a delivery service of music or moving picture.

With respect to a communication wave used for such a two-way communication, frequencies used as stipulated in respective countries are different. Moreover, even within a country, frequency bands used for respective carriers are different. Thus, an antenna corresponding to a broadband so as to receive a plurality of communication waves is desirable.

A technology of mounting a communication antenna on a vehicle roof, as illustrated in FIG. 1, so that a two-way communication function between the vehicle and the outside can be realized, has been proposed.

In the example illustrated in FIG. 1, on a roof 91 of a vehicle 90, an antenna unit 80 having a diversity structure that has a first antenna 81 and a second antenna 82 standing on a ground board 83 separated in a forward and backward direction of the vehicle 90 is mounted. The antennas 81, 82 are housed in a case 84.

Moreover, in an example illustrated in FIG. 2, a glass antenna 100 has been proposed, in which one end for a first radiation pattern 121 is coupled to another end for a second radiation pattern 122 of differing length, arranged in a V-shaped pattern with respect to a vertical direction of a glass surface, and a grounded pattern 110 is arranged below the V-shaped pattern 120 (See Japanese Unexamined Patent Application Publication No. H06-291530). In this example, as a frequency switching type glass antenna for an automobile telephone for corresponding to a plurality of frequencies, for example, electric waves of resonance frequencies of 800 MHz and 1.5 GHz are transmitted and received.

SUMMARY OF THE INVENTION

Technical Problem

However, in the example of Japanese Unexamined Patent Application Publication No. 2012-054915, an antenna unit 80 is projected from a roof 91, thus there was a possibility of affecting a design of a vehicle or an aerodynamic character.

Moreover, in the example illustrated in FIG. 2 of Japanese Unexamined Patent Application Publication No. H06-291530, because the glass antenna 100 is configured of two elements for a radiation pattern 120 (121, 122) and the grounded pattern 110, a wide space for arrangement is required.

Furthermore, in the example illustrated in FIG. 2, because the radiation pattern 120 is from a metallic linear conductive wire, in order to avoid an interference from a side edge part 710d of a vehicle chassis on which a window is arranged and an interference from a defogger arranged on a rear window 600, the glass antenna 100 is required to be arranged separated by a predetermined distance from the side edge part 710d and the defogger. When the antenna is separated from the side edge part, the antenna becomes noticeable, and reduces appearance. When the antenna is separated from the defogger, a size of the defogger is required to be small, and a degree of freedom of design of the defogger is reduced.

In view of such a background, the present invention aims at providing a glass antenna and a vehicle window glass that improves appearance and can perform broadband communication.

Solution to Problem

In order to solve the above-described problem, an aspect of the present invention provides a glass antenna arranged on a vehicle window glass including a slot antenna formed by cutting out a conductive film; and a power supply unit configured to supply power to the slot antenna, the slot antenna including a first slot extending in a first direction;

a second slot connected to one end of the first slot, and extending in a second direction that is different from the first direction, a first wide-width slot connected to the other end of the first slot directly or via a first connection slot, and having a slot width that is greater than a slot width of the first slot, and a second wide-width slot connected to a terminal end portion of the second slot directly or via a second connection slot, and having a slot width that is greater than a slot width of the second slot, and the power supply unit being arranged so as to straddle the first slot, and provides a vehicle window glass provided with the glass antenna.

Effect of Invention

According to an aspect of the present invention, in a glass antenna arranged on a vehicle window glass, it becomes possible to improve appearance and to perform broadband communication.

DETAILED DESCRIPTION OF THE PREFERRED EMBODIMENTS

Figure 1:
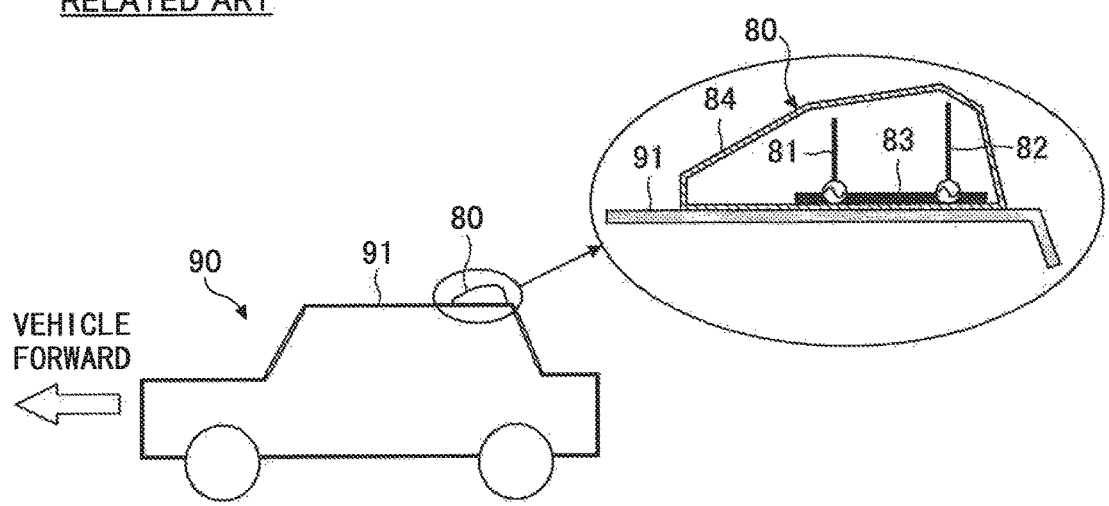
FIG. 1 is an overall view depicting a vehicle in which a communication antenna is arranged according to a related art 1.

In the following, with reference to drawings, embodiments for implementing the present invention will be described. In the drawings for describing embodiments, in the absence of a specific description with respect to a direction, a direction refers to a direction on the drawings. Moreover, the drawings are drawings when viewed facing a surface of a window glass, and drawings may be viewed from the inside (or viewed from the outside) in a state that a window glass is mounted in the vehicle. A right-left direction (transverse direction) on the drawing corresponds to the horizontal direction, and an up-down direction corresponds to the vertical direction. The drawings may be referred to as drawings viewed from the outside.

For example, a window glass according to the present invention is mainly a rear glass mounted in a rear part of a vehicle, and a right-left direction on the drawing corresponds to a vehicle width direction. Moreover, a direction, such as parallel, or orthogonal, or the like allows a deviation enough to keep the effect of the present invention.

Figure 3:
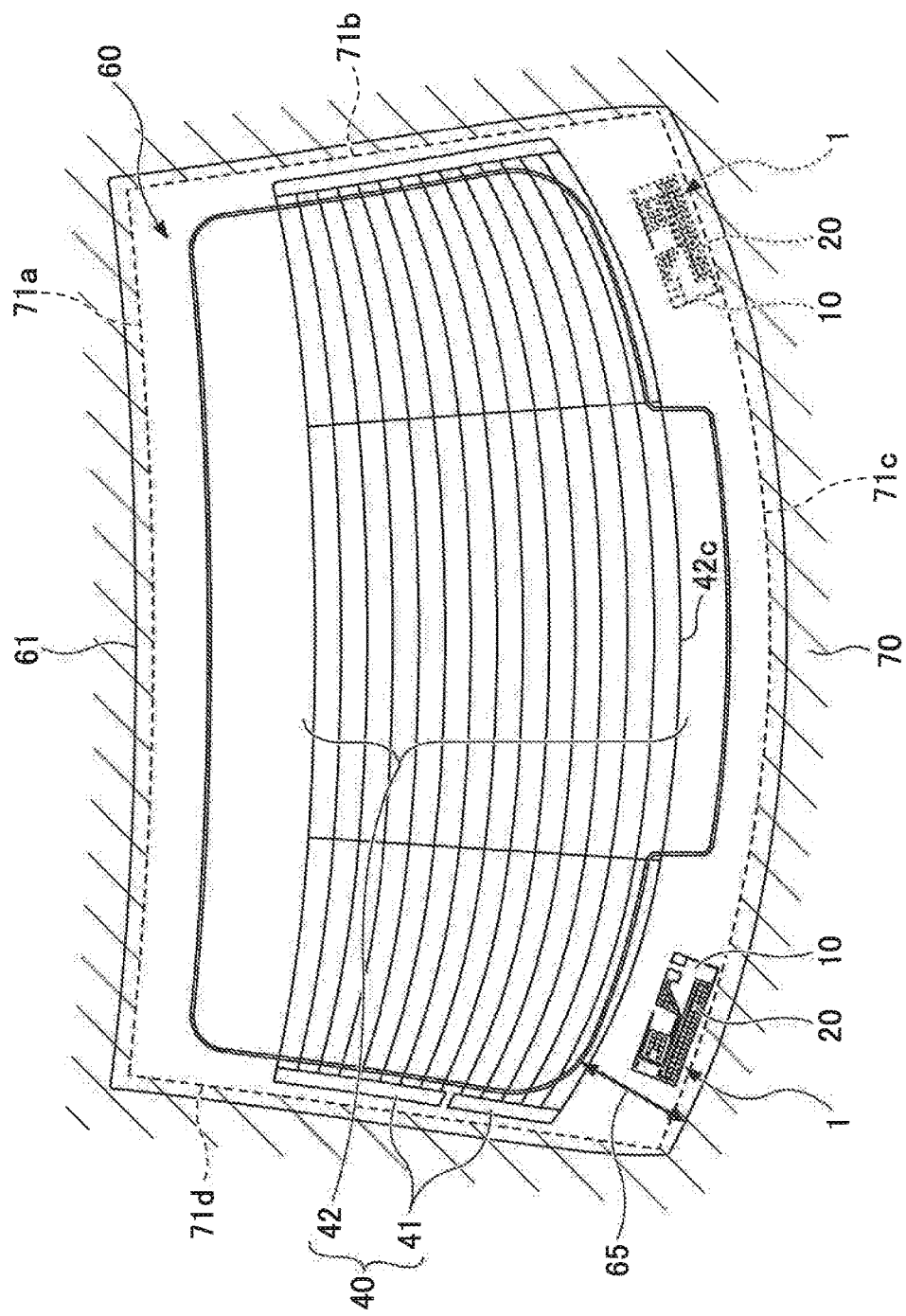
FIG. 3 is an overall plan view depicting a rear window glass in which a communication glass antenna according to an embodiment is arranged.

FIG. 3 is an overall plan view depicting a rear window glass in which a glass antenna (communication glass antenna) according to the embodiment is arranged.

In the present invention, a window glass is an example of a window plate covering an opening of a vehicle body. The window glass is a member having a plate shape. A material of the window glass is not limited to a glass, but may be a resin, a film or the like. A window glass 60 in the vehicle in the rear of the vehicle (also referred to as a vehicle window glass or a rear glass) is mounted on a chassis opening (also referred to as an opening or a window opening) formed of a vehicle chassis (a body or a vehicle body). An outer periphery 61 of the window glass 60 is indicated by solid lines in FIG. 3. A vehicle chassis 70 (a vehicle body or a hatch back door made from a metal or partially from a resin, e.g. including a resin around the opening within a metallic frame) is provided with edge portions (body flanges) 71a, 71b, 71c and 71d forming the window opening of the vehicle (See dashed lines in FIG. 3).

In FIG. 3, the window glass 60 is developed in a plane. A lower edge portion 71c contacting the vehicle chassis 70 is indicated as a curve. When the window glass 60 is mounted in the vehicle, the lower edge portion 71c extends in the vehicle width direction, i.e. in an approximately horizontal direction. Thus, a second slot 12 (See FIG. 4) of a glass antenna 1 that is arranged approximately in parallel with the adjacent lower edge portion 71c, extends in the vehicle width direction, i.e. in an approximately horizontal direction.

In FIG. 3, the glass antenna 1 that is a vehicle glass antenna is formed incorporated on one surface (particularly on a vehicle interior surface) of the window plate (window glass), by printing, embedding, adhering or the like. For example, the glass antenna 1 is configured by arranging a rectangular metallic film 20 that is a conductor in which a cutout portion 10 is formed (e.g. a conductive film formed by baking a silver paste or the like) on one surface of the vehicle window glass (rear glass) 60. Note that the conductive film of the present invention is not limited to a metallic film, and may be, for example, a conductive resin film.

The metallic film 20 is cut into for an elongated hole (making a slit), and radiation is performed from the cutout part as a slot. The glass antenna 1 functions as a slot antenna.

In FIG. 3, a black or brown shielding part (shielding film) 65 is formed in a periphery region on the surface of the window glass 60. On the shielding part 65, an entire antenna 1 is arranged. Alternatively, a part of the antenna 1 may be arranged on the shielding part 65. The shielding part 65 includes a ceramic film such as a black ceramic film.

Moreover, with reference to FIG. 3 as a drawing viewed from inside, when the metallic film 20 forming a slot antenna is attached on a surface of the window glass 60 inside the vehicle, all elements of the glass antenna 1 are arranged on the window glass 60 inside the vehicle. Furthermore, with respect to the glass antenna 1, a part in which at least a resistor 8 and a coaxial cable 8c (See FIG. 5) are installed, or the entire glass antenna 1, is arranged within a region of the shielding part 65.

In the case where the glass antenna 1 is arranged on the surface of the window glass 60 inside the vehicle, a component forming the glass antenna 1 does not exist on the surface outside the vehicle. Furthermore, because the glass antenna 1 is arranged on the shielding part 65, and the entire metallic film 30 or a part of the metallic film 30 is not viewed from outside of the window glass, the window glass is excellent in design.

Furthermore, the shielding part 65 may be formed with shielding dot parts in a portion off the vehicle chassis 70 so that the shielding gradually becomes thinner approaching the center of the window (with a gradation).

As illustrated in FIG. 3, on the window glass 60 that is a rear glass, a defogger 40 having a plurality of heater wires 42 which are parallel to each other and a plurality of belt-like bus bars 41 which supply power to the heater wires 42 may be arranged. The heater wires 42 and the bus bars 41 that configure the defogger 40 are electrically heating type conducting patterns.

In FIG. 3, the glass antenna 1 is arranged in the window glass 60 below the defogger 40, i.e. in a margin region between the lowermost heater wire 42c of the defogger 40 and a lower edge portion 71c of the opening of the vehicle chassis 70.

Even if the shape of the window glass is the same as the above, when for example, a rear support part of a backseat banks upward, a metallic part of the rear support part (including a part of a metallic body supporting the rear support part, a metallic frame part, or a metallic body part of a speaker embedded in the rear support part) may project upward relative to the lower edge portion 71c of the opening of the vehicle chassis 70, and may be arranged in proximity to the glass antenna. In this case, the glass antenna is affected more from the metallic part of the rear support part than the lower edge portion 71c of the opening of the vehicle chassis 70.

Thus, in the case of attaching a glass antenna 1 to a vehicle with a configuration that is liable to be affected by the metallic part of the rear support part, in the margin region between the lowermost heater wire 42c and the lower edge portion 71c, the glass antenna 1 can be arranged at a position that is above the position illustrated in FIG. 3, and adjacent to the lowermost heater wire 42c or at a position in the middle.

In any case, the glass antenna 1 is arranged, for example, at either a corner portion between the lower edge portion 71c of the opening of a vehicle chassis 70 and a side edge portion 71d continuing into the lower edge portion 71c (a part indicated by solid lines in the lower left position in FIG. 3), or near a corner portion between the lower edge portion 71c and a side edge portion 71b continuing into the lower edge portion 71c (a part indicated by dotted lines in the lower right position in FIG. 3).

Alternatively, in the window glass 60, the glass antenna 1 may be arranged adjacent to either of the left and right corner portions of the upper edge portion 71a of the vehicle chassis 70. In this case, the configuration is flipped top-bottom.

Note that the glass antenna 1 can function independently, but in order to further improve the communication capacity or for other use, in areas near the right and left corner portions of the opening of the window glass 60, illustrated in FIG. 3, as a MIMO configuration, two glass antennas 1 having a left-right symmetric configuration may be arranged. Alternatively, two antennas may be arranged combining antennas according to differing embodiments.

In a description of a first embodiment, a configuration of the glass antenna 1 assumed to be arranged at a lower left position as indicated by solid lines in FIG. 3 will be described.

First Embodiment

Figure 4:
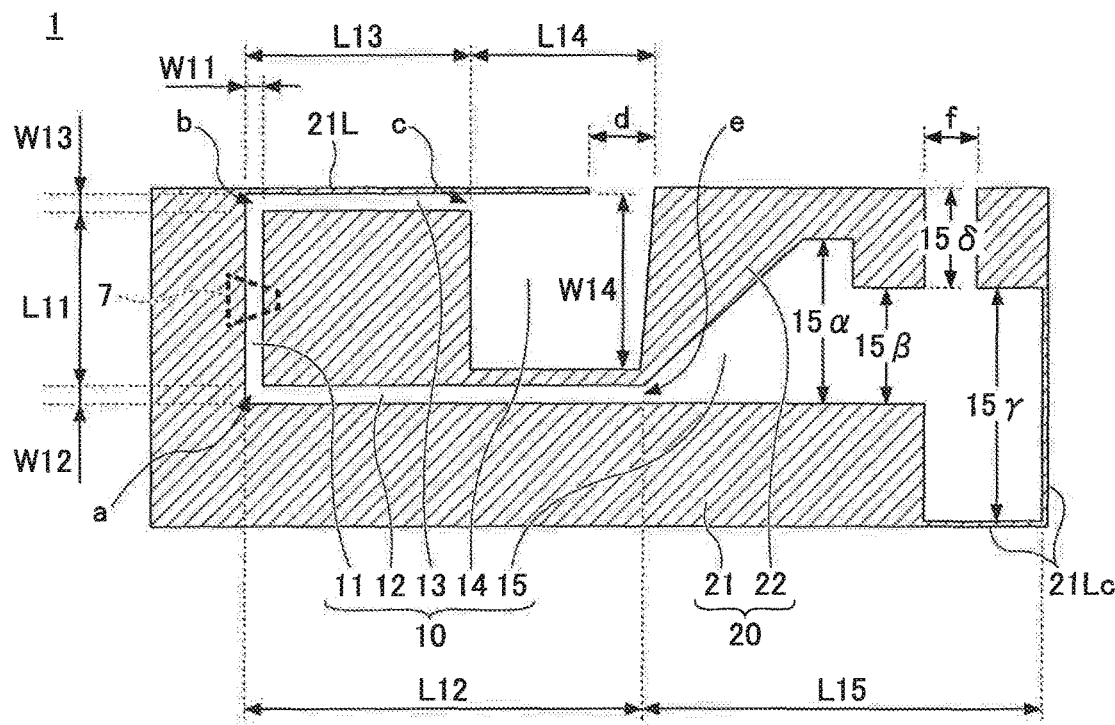
FIG. 4 is an enlarged view depicting a communication glass antenna according to a first embodiment.

FIG. 4 is an enlarged view depicting a glass antenna according to a first embodiment arranged on a vehicle window glass 60.

The glass antenna 1, in which a cutout portion 10 is formed in a metallic film (conductive film) 20, functions as a slot antenna. Specifically, in the metallic film 20, a first slot 11, a second slot 12, a first connection slot 13, a first wide-width slot 14 and a second wide-width slot are formed as a cutout portion 10. A power supply unit (power supply points) 7 is arranged so as to straddle the first slot 11.

The first slot 11, on which the power supply unit 7 is arranged so as to straddle the first slot 11, extends in an approximately up-down direction (first direction) from a lower end (one end) "a" to an upper end (the other end) "b". In the embodiment, the extension direction of the first slot 11 is an approximately vertical direction on a surface of the window glass 60.

The first connection slot 13 is connected to the other end "b" of the first slot 11, and extends to a width changing portion "c" in a direction different from the first direction. In the first embodiment, the extension direction of the first connection slot 13 is an approximately horizontal direction (third direction).

The first wide-width slot 14 is connected to the end portion (width changing portion) "c" of the first connection slot 13, and a slot width of the first wide-width slot 14 is greater than a slot width of the first slot 11 and a slot width of the first connection slot 13.

The second slot 12 is connected to the one end "a" of the first slot 11, and extends in an approximately horizontal direction, that is different from the first direction, and in a vehicle width direction (second direction).

The second wide-width slot 15 is directly connected to an end portion "e" of the second slot 12 (terminal end portion of the second slot 12), and a slot width of the second wide-width slot 15 is greater than a slot width of the second slot 12. In the first embodiment, the slot width of the second wide-width slot 15 gradually becomes greater as extending from the end portion "e".

Note that a corner of the slot may be a curve having a curvature. Moreover, the end portion may refer to a terminal end portion of the slot, or may refer to a neighborhood of the terminal end before the end portion of the slot.

The approximately upward direction means a direction towards relatively high end portions, and includes upward in the vertical direction and obliquely upward. The approximately downward direction means a direction towards relatively low end portions, and includes downward in the vertical direction and obliquely downward.

For example, a mounting angle of the window glass 60 for the vehicle falls, for example, preferably within a range of 15° to 90° with respect to a horizon plane. The up-down direction of the glass antenna is an up-down direction on a surface of the window glass, and has the same inclination as that of the window glass.

As described above, the glass antenna 1 illustrated in FIG. 4 is arranged adjacent to a corner portion between a lower edge portion 71c of an opening of a vehicle chassis 70 and a side edge portion 71d continuing into the lower edge portion 71c (See a part indicated by solid lines in FIG. 3). Thus, a left part of the glass antenna 1 illustrated in FIG. 4 comes close to the side edge portion 71d of the corner portion of the opening of the vehicle chassis 70, and the lower part of the glass antenna 1 comes close to the lower edge portion 71c of the corner portion.

As illustrated in FIG. 4, the first wide-width slot 14 opens (opening "d") on a side (upper side) away from the lower edge portion 71d of the corner portion of the vehicle chassis 70, near to which the glass antenna 1 is arranged.

The second wide-width slot 15 opens (opening "f") on a side (upper side) away from the lower edge portion 71d of the corner portion of the vehicle chassis 70, near to which the glass antenna 1 is arranged.

In the metallic film 20, a part closer to a corner portion between the lower edge portion 71c and the side edge portion 71d, near to which the glass antenna 1 is arranged, with respect to the second slot 12 and the first slot 11, functions as a ground side conductive body 21. A part farther from the corner portion with respect to the second slot 12 and the first slot 11 functions as a core wire side conductive body 22.

The power supply unit 7 is a pair of power supply parts including a core wire side power supply part and a ground side power supply part. The power supply unit 7 is arranged so as to straddle the first slot 11 by a pair of power supply parts, and thereby supplying power to the ground side conductive body 21 and the core wire side conductive body 22.

In the first embodiment, as an example, the opening "d" is arranged in the upper side of the first wide-width slot 14, and the opening "f" is arranged in the upper side of the second wide-width slot 15. However, the positions of the opening "d" and the opening "f" are not limited to the upper side.

In the first embodiment, the opening "d" and the opening "f" are preferably away from the corner portion of the vehicle chassis 70 near to which the glass antenna 1 is arranged. Thus, as a variation of the first embodiment, the first wide-width slot 14 and the second wide-width slot 15 may open on the side away from the side edge portion 71d of the corner portion of the vehicle chassis 70 (right side of the antenna 1 illustrated in FIG. 4).

When the opening "d" is formed, according to a shape and an arrangement of the first connection slot 13, an upper part of the ground side conductive body 21 of the metallic film 20 has a linear shape. The linear part 21L of the ground side conductive body 21 has a function of radiating an electric wave at a specific frequency as a linear element.

Note that because the linear part 21L of the ground side conductive body 20 is located at a position away from the corner portion of the vehicle chassis 70 near to which the glass antenna 1 is arranged, the linear part 21L is not liable to be affected by interference from the vehicle chassis 70 that would affect a linear element.

Moreover, as illustrated in FIG. 4, in the glass antenna 1 according to the first embodiment, the ground side conductive body 21 and the core wire side conductive body 22 of the metallic film 20 are provided with solid portions (solid-fill portions) with wide widths.

However, when an area of the solid portion is too great, due to a difference in thermal absorption between glass and metal, the form of a glass may be adversely affected and a distortion may occur.

Figure 5:
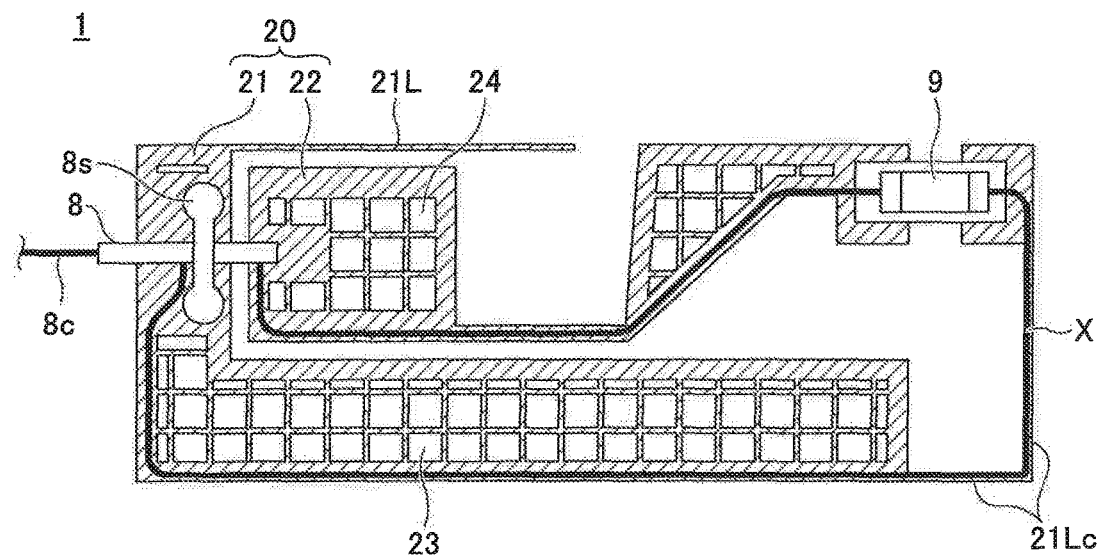
FIG. 5 is an enlarged view depicting an antenna obtained by forming a cut out portion and arranging a resistor in the communication glass antenna illustrated in FIG. 4.

Thus, in order to increase the width of the metallic film 20 with maintaining the form characteristics of glass, in the ground side conductive body 21 and the core wire side conductive body 22, grid-like cutout portions (perforated portions, notch portions) 23, 24 may be formed in the region where the power supply unit 7 and a resistor 9 are not arranged (See FIG. 5). The configuration of the cutout portions is not limited to a grid, but may be a triangle, a circle or the like. Moreover, a size of each element of the cutout portions 23, 24 is set smaller than the size of the smallest slot (in the example illustrated in FIG. 4, the first slot 11) to an extent not to affect the other slots.

FIG. 5 is an enlarged view depicting an antenna obtained by forming cutout portions 23, 24 in the glass antenna 1 illustrated in FIG. 4, and arranging an on-glass connector for connecting coaxial cable (in the following, also referred simply to as a connector) 8 connected to a coaxial cable 8*c*, to the resistor 9 and the power supply unit 7.

In the present invention, the ground side conductive body 21, the core wire side conductive body 22, the power supply unit 7, the resistor 9, the coaxial cable 8*c* and an on-glass connector for connecting coaxial cable 8 are arranged on one interior surface (first surface) of the window glass 60 that is a conductive body.

In the first embodiment, as described above, the on-glass connector for connecting coaxial cable 8 is soldered to the power supply unit 7, which is arranged so as to straddle the first slot 11, with solder 8*s*. In the on-glass connector for connecting coaxial cable, an internal conductive body of the coaxial cable 8*c* is connected and soldered to the core wire side conductive body 22 of the metallic film 20, and an external conductive body of the coaxial cable 8*c*, such as a braided wire, is connected and soldered to the ground side conductive body 21.

In the communication antenna that is a subject of the present invention, information including a telematics service is sent/received. As a property of telematics service, a real-time property and urgency are required, and a connected state of network is required to be maintained. Thus, in the first embodiment, a resistor 9 for detecting connection state may be arranged so as to detect a connection state of at least an antenna.

In the first embodiment, the resistor 9 is assumed to be a resistor module with a greater size than a wavelength. When the resistor module is arranged on the antenna, the antenna characteristics may vary. Thus, the resistor 9 and the connector 8 are preferably arranged at positions separated from each other. As illustrated in FIG. 5, the configuration of the glass antenna 1 according to the embodiment assumes that the resistor 9 and the connector 8 are arranged at positions separated from each other.

Specifically, because the coaxial cable 8*c* is wired from the side edge portion 71*d* side of the vehicle chassis 70, the connector 8 to be connected to the coaxial cable 8*c* is arranged in the left part of the glass antenna 1 that is near the side edge portion 71*d* (See FIG. 3), as illustrated in FIG. 5. In the first embodiment, the resistor 9 is attached to the glass antenna 1 so as to straddle the second wide-width slot 15 in order to be separated from the first slot 11, on which the coaxial cable 8*c* and the connector 8 are arranged, as far as possible.

In the configuration of the embodiment, the second wide-width slot 15 includes a resistor installation part 15δ for installing the resistor 9 having an approximately parallel and rectangular slot shape where one peripheral edge of the slot part has the same width as the opening "f" and which is a narrower width than of the peripheral slot part.

The second wide-width slot 15 includes, in addition to the resistor installation part 15δ with the same width as the opening "f", a triangle part 15α having a triangle portion and a portion in which the widest part of the triangle portion is extended, a resistor facing extension part 15γ that faces the resistor installation part 15δ, and a wide-width connection part 15β arranged between the triangle part 15α and the resistor facing extension part 15γ. Because a width of the resistor facing extension part 15γ is wide, a shape of a corresponding part in the ground side conductive body 21 becomes linear and thin (linear corner portion conductive body 21Lc).

According to the above-described configuration, the ground side conductive body 21 and the core wire side conductive body 22 of the metallic film 20 form a closed circuit with a route that includes the resistor 9 and is connected to the internal conductive body and to the external conductive body such as a braided wire, of the coaxial cable 8*c*, which are connected to the connector 8.

In the above-described configuration, when a predetermined range of resistance value for the circuit including the resistor 9 is not obtained by a communication device (not shown) installed in the vehicle and connected to the coaxial cable, it is detected that an antenna is not connected and that a communication cannot be performed.

The ground side conductive body 21 and the core wire side conductive body 22 are metallic films formed by printing a paste including conductive metal, such as a silver paste, on a vehicle interior surface of the window glass 60 and baking the paste. Note that not limited to the formation method, the metallic film may be formed by attaching a linear shaped body or a foil shaped body including a conductive material such as copper to any one of the vehicle interior surface or a vehicle exterior surface of the window glass via an adhesive agent or the like. In the case where the window glass is a laminated glass, the metallic film may be arranged inside the window glass.

Moreover, by arranging a resistor 9, a member indicated by X in FIG. 5 can function as a disconnection detection path for detecting a breakage of the vehicle window glass 60.

Moreover, because the window glass 60 is a rear glass, and typically a strengthened glass is used, when the window glass is broken, the window glass becomes fine granular fragments. When the window glass 60 is broken, the core wire side conductive body 22 and the ground side conductive body 21 in the state of silver paste printed on the window glass 60 also become granular fragments and are broken.

In the case where the disconnection detection path X is formed by connecting the core wire side conductive body 22 and the ground side conductive body 21 with the connector 8 connected to the power supply unit 7 and with the resistor 9, when a disconnection occurs in the disconnection detection path X, the value of resistance becomes infinity, and thereby a breakage of the window glass 6 can be detected.

Because the antenna according to the embodiment can detect a breakage of a glass by detecting a disconnection, it is not necessary to separately arrange a glass breakage detection means on the window glass 60. Because a number of parts arranged on the window glass can be reduced, a space for arranging an antenna and a glass breakage detection means can be reduced, and the appearance of the window glass is improved.

Furthermore, in the first embodiment, as illustrated in FIG. 5, because the resistor 9 is arranged separated from the power supply unit 7, an electric current around the power supply unit 7 can be prevented from receiving interference from the resistor 9.

In the case where the vehicle chassis is made of a metal, when a radiating element of a linear antenna in a silver paste state is arranged at a position near the vehicle chassis, due to an interference with a metal, a reception gain for an antenna tends to be reduced.

In the embodiment of the present invention, for any of the embodiments illustrated in FIGS. 4 and 6 to 14 being employed, the radiating element is a slot antenna; thus an electric field, made by an electric current flowing inside the metallic film 20 forming slots, is formed in a closed form. Thus, the antenna according to the embodiment is not liable to be affected by interference with a metal or a resin.

For the antenna according to the embodiment, even if a metal, such as a defogger, or a vehicle chassis, is in proximity around the antenna, or even if a resin part of the vehicle chassis is in proximity around the antenna, a stable characteristic can be obtained. Furthermore, even if a metallic film such as a transparent conductive film is formed around the antenna, an antenna that is not liable to be affected by interference can be formed in the same way as above.

Frequencies used for communication as specified by countries are different from each other. Even within one country, frequency bands used for respective carriers are different from each other. An antenna for accommodating a wide band so that a plurality of communication waves can be sent and received is preferable.

For UHF (Ultra High Frequency) waves used for communication, the glass antenna according to the present invention is set to perform communication in, for example, three bands, 0.698 GHz to 0.96 GHz (Band 1), 1.71 GHz to 2.17 GHz (Band 2) and 2.4 GHz to 2.69 GHz (Band 3), among the bands used for LTE (Long Term Evolution).

Furthermore, the glass antenna according to the present invention is set to perform communication in an ISM (Industry Science Medical) band, as a frequency band used for communication. The ISM band used for communication includes 0.863 GHz to 0.870 GHz (Europe), 0.902 GHz to 0.928 GHz (US) and 2.4 GHz to 2.5 GHz (common worldwide). A communication standard using a 2.4 GHz band that is an example of the ISM band includes a wireless LAN of the DSSS method in compliance with IEEE 802.11b, Bluetooth (trademark registered), a part of FWA system and the like.

The ISM bands in US and Europe overlap with a band of the Band 1 of the LTE, and the ISM band common worldwide overlaps with the Band 3 of the LTE. The glass antenna according to the embodiment also can be applied to the ISM bands for communication.

Specifically, in the first embodiment, as a glass antenna, by forming slots 11, 12, 13 and wide-width slots 14, 15 with different lengths and different widths, an antenna that can accommodate a plurality of wide frequency bands is obtained.

Furthermore, in field tests for communication service in recent years, in the low frequency band, the vertically polarized wave tends to be emphasized. Thus, in the embodiment, because the second slot 12, the first connection slot 13, the first wide-width slot 14 and the second wide-width slot 15 extend in approximately horizontal directions, the glass antenna according to the embodiment can send and receive vertically polarized radio waves.

Thus, the glass antenna according to the embodiment of the present invention, without affecting a design of the vehicle or an aerodynamic characteristic as in the related art illustrated in FIG. 1, and without deteriorating an appearance because the antenna is arranged near the outer periphery 61 of the window glass 60, can accommodate wide bands including a plurality of bands.

Note that in the first embodiment, in an aspect of installation of the glass antenna, the second slot 12, the first connection slot 13, the first wide-width slot 14 and the second wide-width slot 15 are assumed to extend in an approximately horizontal direction, so as to obtain an antenna mainly accommodating a vertically polarized wave in a low frequency region. When the second slot 12, the first connection slot 13, the first wide-width slot 14 and the second wide-width slot 15 extend in an approximately vertical direction, an antenna mainly accommodating a horizontally polarized wave can be obtained.

Because the vehicle is a movable body, the vehicle is preferably provided with a plurality of communication antennas and is able to select a radio wave by switching to an antenna with higher receiving sensitivity depending on a location. Alternatively, a MIMO configuration that increases a communication capacity by a plurality of antennas is further preferable.

In the present invention, a wide band antenna having the same configuration as the antenna 1 according to the embodiment may be arranged at a position approximately symmetric to the antenna 1 with respect to a center line extending in the width direction of the window glass 60 (See FIG. 3). In such a case, in order to avoid interference to each other, the plurality of antennas are preferably arranged separated by a predetermined distance (e.g. greater than or equal to 0.2 times a wavelength of an electric wave with a frequency of 0.7 GHz, i.e. 86 mm). In this way, by arranging a plurality of glass antennas on the window glass 60 so that the communication performance is enhanced by switching antennas, or by providing the MIMO configuration, also in the vehicle that is a movable body, the effect of improving the communication capacity in a wide band can be obtained.

Second Embodiment

Figure 6:
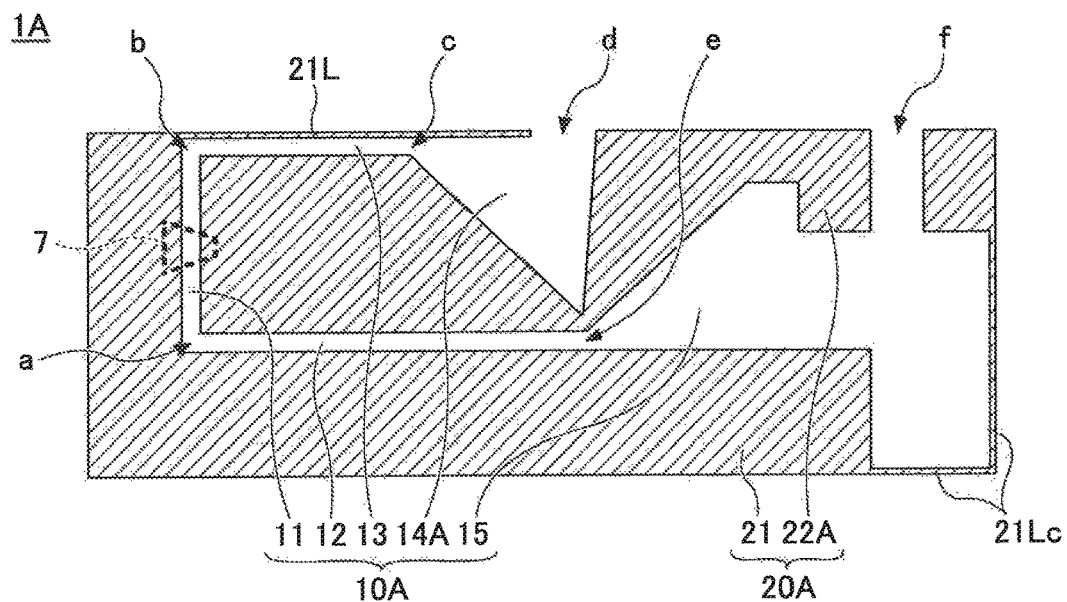
FIG. 6 is an enlarged view depicting a glass antenna according to a second embodiment.

FIG. 6 is an enlarged view depicting a glass antenna 1A according to a second embodiment.

In the first embodiment, regarding shapes of wide-width slots, the shape of the first wide-width slot is a quadrangle, and the shape of the second wide-width slot is a triangle. However, the shapes of the wide-width slots are not limited to the above. In the second embodiment, the shape of the first wide-width slot 14A is a triangle in which a slot width gradually becomes greater as extending from the end portion "c".

Third Embodiment

Figure 7:
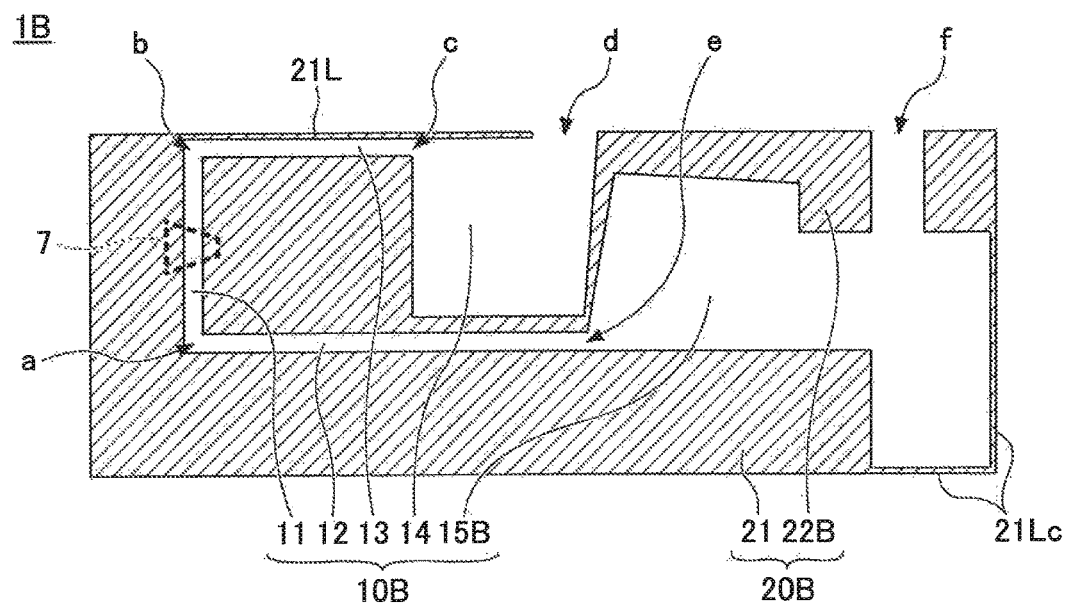
FIG. 7 is an enlarged view depicting a glass antenna according to a third embodiment.

FIG. 7 is an enlarged view depicting a glass antenna 1B according to a third embodiment.

A second wide-width slot 15B of the glass antenna 1B according to the third embodiment includes a quadrangular shaped portion which rapidly increases a width at a width changing portion "e".

In the first to third embodiments, the first connection slot 13 is shorter than the second slot 12. The first wide-width slot 14 (14A) connected to the first connection slot 13 is arranged between the first slot 11 and the second wide-width slot 15 (15B) in the vehicle width direction (direction approximately parallel to the lower edge portion 71c).

According to the above-described configuration, the metallic film 20 (20A, 20B) configuring the slot antenna can be formed in a horizontally long rectangular shape. Thus, an arrangement space of the metallic film 20 (20A, 20B) forming the glass antenna 1 (1A, 1B) can be made small in the vertical direction.

Even when the defogger 40 occupies the largest part of the window glass (rear glass) 60 in the up-down direction, the glass antenna 1 with an arrangement space that is small in the up-down direction can be arranged in a small margin region in the window glass 60.

Fourth Embodiment

Figure 8:
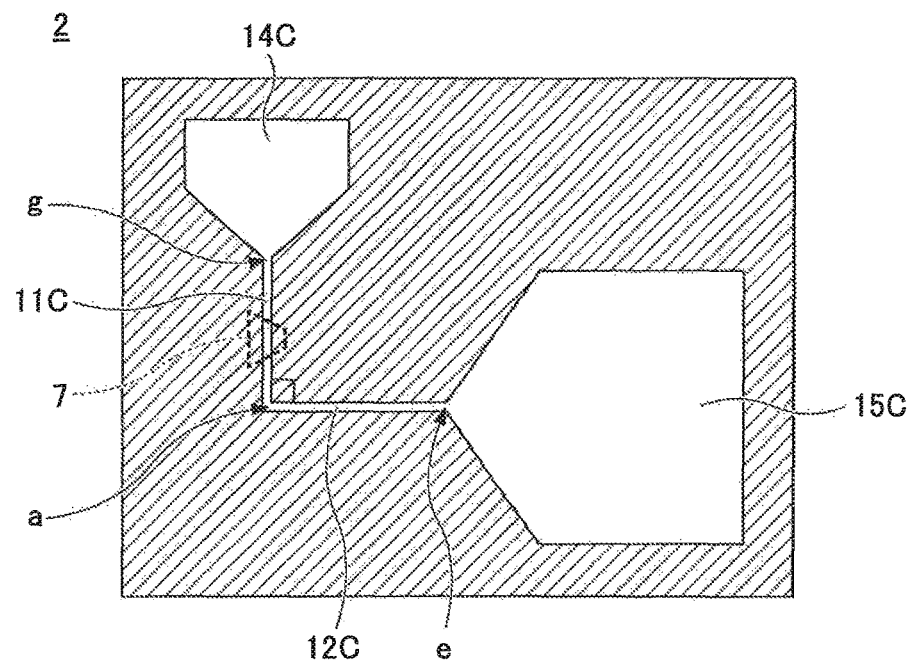
FIG. 8 is an enlarged view depicting a glass antenna according to a fourth embodiment.

FIG. 8 is an enlarged view depicting a glass antenna 2 according to a fourth embodiment.

The glass antenna 2 according to the fourth embodiment is different from the glass antenna according to any of the first to third embodiments in that the first slot 11C is directly connected to the first wide-width slot 15C at the end portion "g", without inserting the first connection slot 13. Note that the second wide-width slot 15C is connected to the second slot 12C.

In the first to third embodiments, examples of the horizontally long slot antenna in which an arrangement space is small in the vertical direction and great in the horizontal direction have been described. The following embodiment can be applied to the case where a horizontal length of the arrangement space is limited and a vertical length can be ensured, or the like. Depending on a shape of a region where the antenna is arranged, an embodiment can be appropriately selected.

In the fourth embodiment, illustrated in FIG. 8, each of the first wide-width slot 14C and the second wide-width slot 15C is of a shape obtained by combining a triangle, in which a width gradually increases as it extends, and a quadrangle.

As a variation of the fourth embodiment, each of the first wide-width slot 14C and the second wide-width slot 15C may be of a shape of a triangle in which a width gradually increases as it extends. Moreover, in order to arrange a resistor 9, an opening as illustrated in FIG. 5 may be formed in a part of the second wide-width slot 15C away from the corner portion near to which the glass antenna 2 is arranged. Furthermore, the second wide-width slot 15C may be of a shape obtained by combining the triangle with another quadrangle.

Fifth Embodiment

Figure 9:
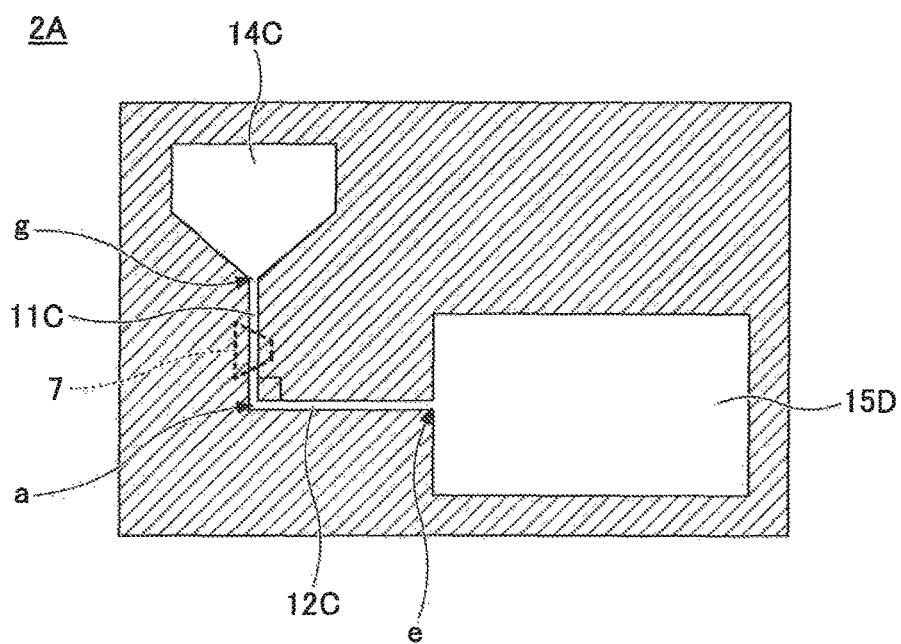
FIG. 9 is an enlarged view depicting a glass antenna according to a fifth embodiment.

FIG. 9 is an enlarged view depicting a glass antenna 2A according to a fifth embodiment.

The glass antenna 2A according to the fifth embodiment is different from the glass antenna 2 according to the fourth embodiment illustrated in FIG. 8 in that the second wide-width slot 15D has a quadrangular shape.

Sixth Embodiment

Figure 10:
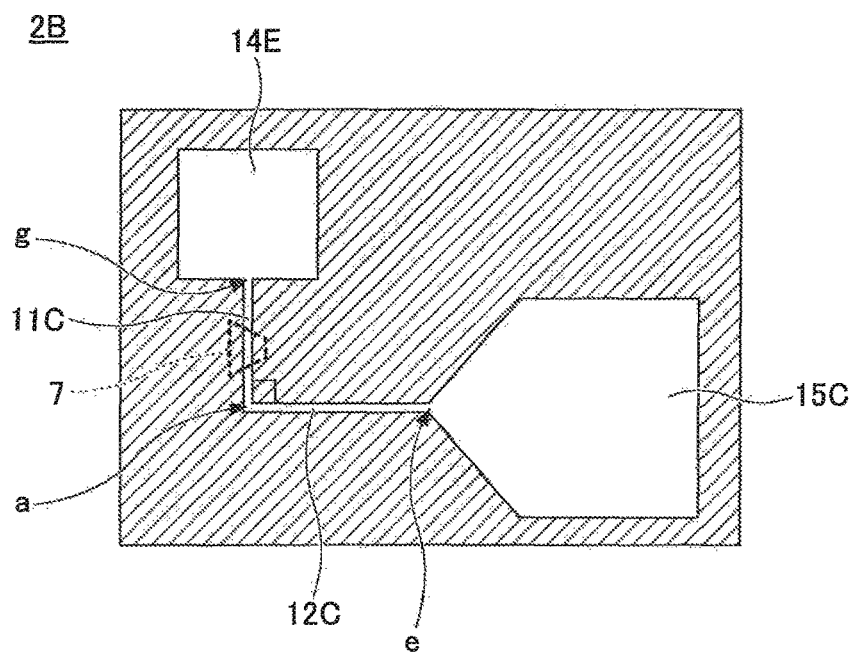
FIG. 10 is an enlarged view depicting a glass antenna according to a sixth embodiment.

FIG. 10 is an enlarged view depicting a glass antenna 2B according to a sixth embodiment.

The glass antenna 2B according to the sixth embodiment is different from the glass antenna 2 according to the fourth embodiment illustrated in FIG. 8 in that the first wide-width slot 14E has a quadrangular shape.

Seventh Embodiment

Figure 11:
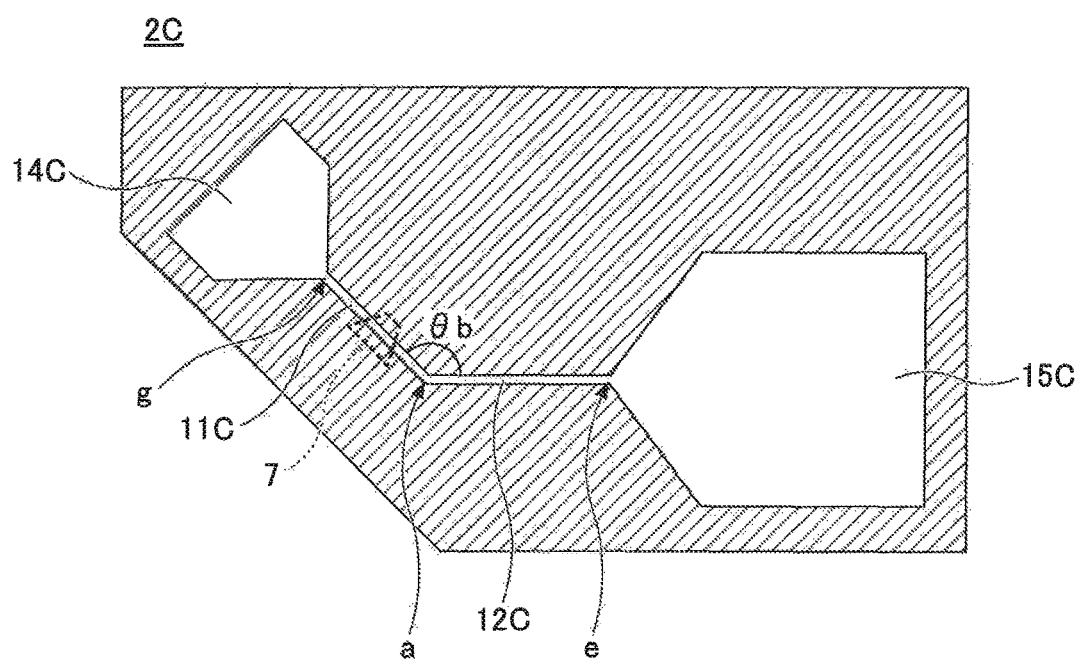
FIG. 11 is an enlarged view depicting a glass antenna according to a seventh embodiment.

FIG. 11 is an enlarged view depicting a glass antenna 2C according to a seventh embodiment.

In the above-described embodiments, a bending angle of a bending portion "a" was a right angle. The bending angle may be changed depending on a shape of a flange of the window on which the glass antenna is arranged, an arrangement position of another member, or a position of wiring.

The glass antenna 2C according to the seventh embodiment is different from the glass antenna 2 according to the fourth embodiment illustrated in FIG. 8 in that the bending angle $\theta_b$ of the bending portion "a" is an obtuse angle.

Eighth Embodiment

Figure 12:
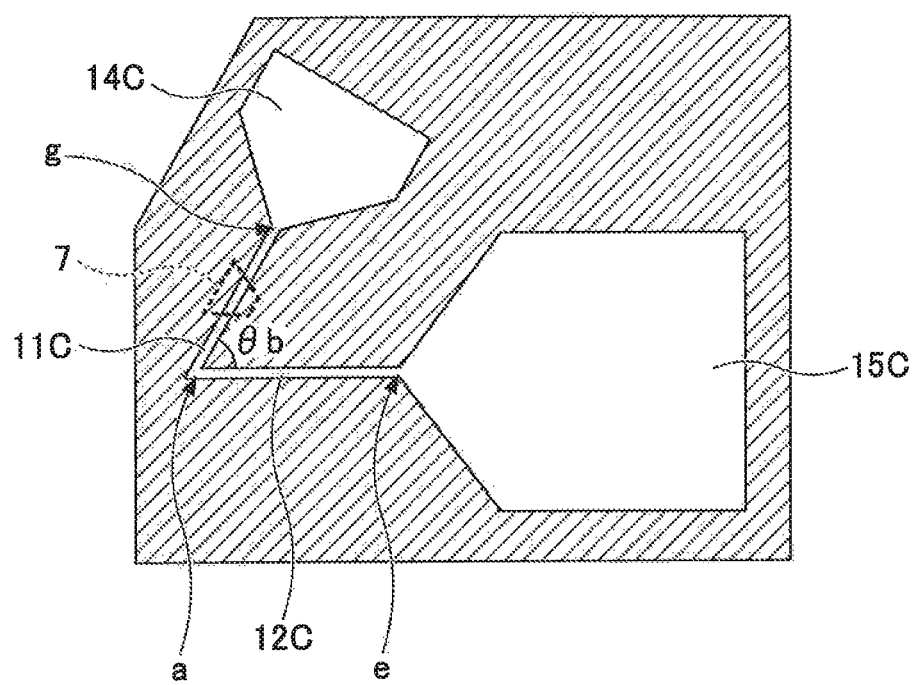
FIG. 12 is an enlarged view depicting a glass antenna according to an eighth embodiment.

FIG. 12 is an enlarged view depicting a glass antenna 2D according to an eighth embodiment.

The glass antenna 2D according to the eighth embodiment is different from the glass antenna 2 according to the fourth embodiment illustrated in FIG. 8 in that the bending angle $\theta_b$ of a bending portion "a" between a first slot 11C and a second slot 12C is an acute angle.

In the first to eighth embodiments, as described above, the glass antenna was assumed to be arranged at the lower left corner portion of the window illustrated in FIG. 3. The above-described glass antenna may be flipped horizontally and arranged at the lower right corner portion of the window illustrated in FIG. 3.

In ninth and tenth embodiments, a position to which a power supply point is connected and an arrangement position on the window glass 60 are flipped horizontally from those of the above-described embodiments (glass antenna 1, 1A or 1B). A glass antenna 3 (3A) according to the ninth or tenth embodiment, which will be arranged at the position of the antenna 1 in the lower right part indicated by dotted lines illustrated in FIG. 3, will be described as an example as follows. Even in the configuration according to the ninth or tenth embodiment, the glass antenna 3 (3A) may be flipped horizontally so as to be arranged at the position of the antenna 1 in the lower left part illustrated in FIG. 3.

Ninth Embodiment

Figure 13:
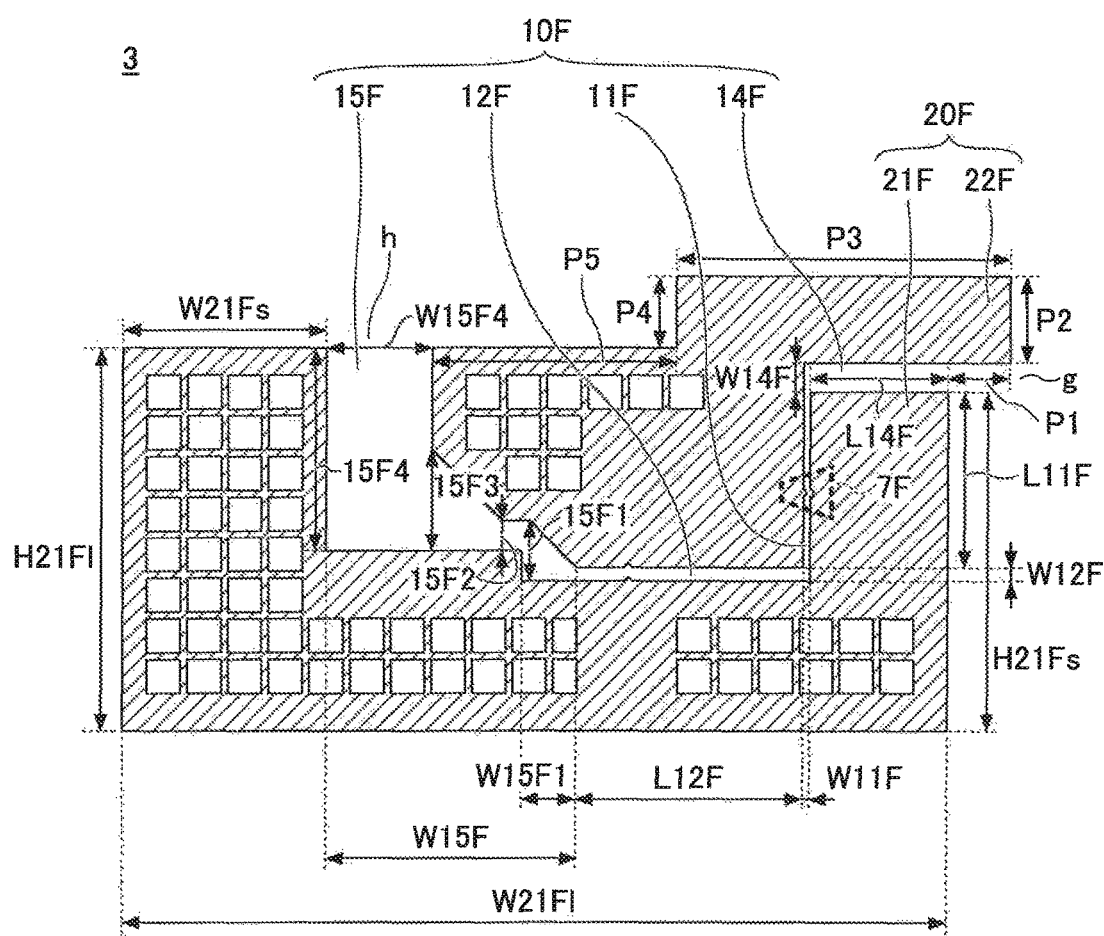
FIG. 13 is an enlarged view depicting a glass antenna according to a ninth embodiment.

FIG. 13 is an enlarged view depicting a glass antenna 3 according to the ninth embodiment arranged on a vehicle window glass 60.

The glass antenna 3 functions as a slot antenna by forming a cutout portion 10F in a metallic film (conductive film) 20F.

Specifically, in the metallic film 20F, a first slot 11F, a second slot 12F, a first wide-width slot 14F, and a second wide-width slot 15F are formed as cutout portions 10F. Then, a power supply unit (power supply points) 7F is arranged so as to straddle the first slot 11F.

In the ninth embodiment, the metallic film 20F configuring the slot antenna opens in the side edge direction and opens upward. Specifically, as illustrated in FIG. 13, the first wide-width slot 14F opens to the side (right side in FIG. 13) close to the side edge portion 71b of the corner portion of the vehicle chassis 70 near to which the glass antenna 3 is arranged (opening "g").

Moreover, the second wide-width slot 15F opens to a side (upper side in FIG. 13) away from the lower edge portion 71c of the corner portion of the vehicle chassis 70 near to which the glass antenna 3 is arranged (opening "h").

The first slot 11F, which the power supply unit 7F is arranged to straddle, extends in an approximately up-down direction (first direction) from a lower end (one end) to an upper end (other end). In the ninth embodiment, the extension direction of the first slot 11F is an approximately vertical direction on a surface of the window glass 60.

The first wide-width slot 14F is connected to the other end (upper end) of the first slot 11F, and has a greater slot width than that of the first slot 11F.

The second slot 12F is connected to the one end (lower end) of the first slot 11F, and extends in a vehicle width direction (second direction), that is an approximately horizontal direction different from the first direction.

The second wide-width slot 15F is connected to an end portion of the second slot 12F (terminal end portion of the second slot 12F), and has a greater slot width than that of the second slot 12F.

In the ninth embodiment, the slot width of the second wide-width slot 15F gradually increases as it extends from a constricted portion 15F2 that once narrows, and the slot width increases in a step-by-step manner. Specifically, the second wide-width slot 15F according to the ninth embodiment includes the first gradually increasing extension portion 15F1, the constricted portion 15F2, a second gradually increasing extension portion 15F3, and a rectangular portion 15F4.

The first gradually increasing extension portion 15F1 is connected to the end portion of the second slot 12F, and the slot width of the first gradually increasing extension portion 15F1 gradually increases as it extends in the horizontal direction. The constricted portion 15F2 is connected to the increased end portion of the first gradually increasing extension portion 15F1. The slot width is reduced by removing part of an increase in slot width, extending from the end portion of the second slot 12F, of the first gradually increasing extension portion 15F1. The second gradually increasing extension portion 15F3 is connected to an end portion of the constricted portion 15F2, and a slot width of the second gradually increasing extension portion 15F3 gradually increases as it extends. The rectangular portion (part opening upward) 15F4 is connected to the increased end portion of the second gradually increasing extension portion 15F3, and extends upward forming a width of the opening "h" in a rectangular shape.

In the ninth embodiment, in the metallic film 20F, an approximately U-shaped conductive body below the second slot 12F and the first slot 11F functions as a ground side conductive body 21F. A conductive body, above the second slot 12F and the first slot 11F, and having a shape of a part of which fits into a recess area of the U-shape, functions as a core wire side conductive body 22F.

Note that the shape of the metallic film 20F according to the ninth embodiment is not a rectangle. A part of the core wire side conductive body 22F projects (protrudes) to the side edge portion 71b side of the metallic chassis 70 with respect to the ground side conductive body 21F (right side in FIG. 13). Moreover, a part of the core wire side conductive body 22F projects upward with respect to the ground side conductive body 21F.

By adjusting the positional relationship between the ground side conductive body 21F and the core wire side conductive body 22F or amounts of projection in the lateral direction and in the upward direction, the antenna characteristic of the glass antenna 3 can be controlled.

Moreover, also in the ninth embodiment, the power supply unit 7F arranged so as to straddle the first slot 11F supplies power to the ground side conductive body 21F and the core wire side conductive body 22F.

Figure 14:
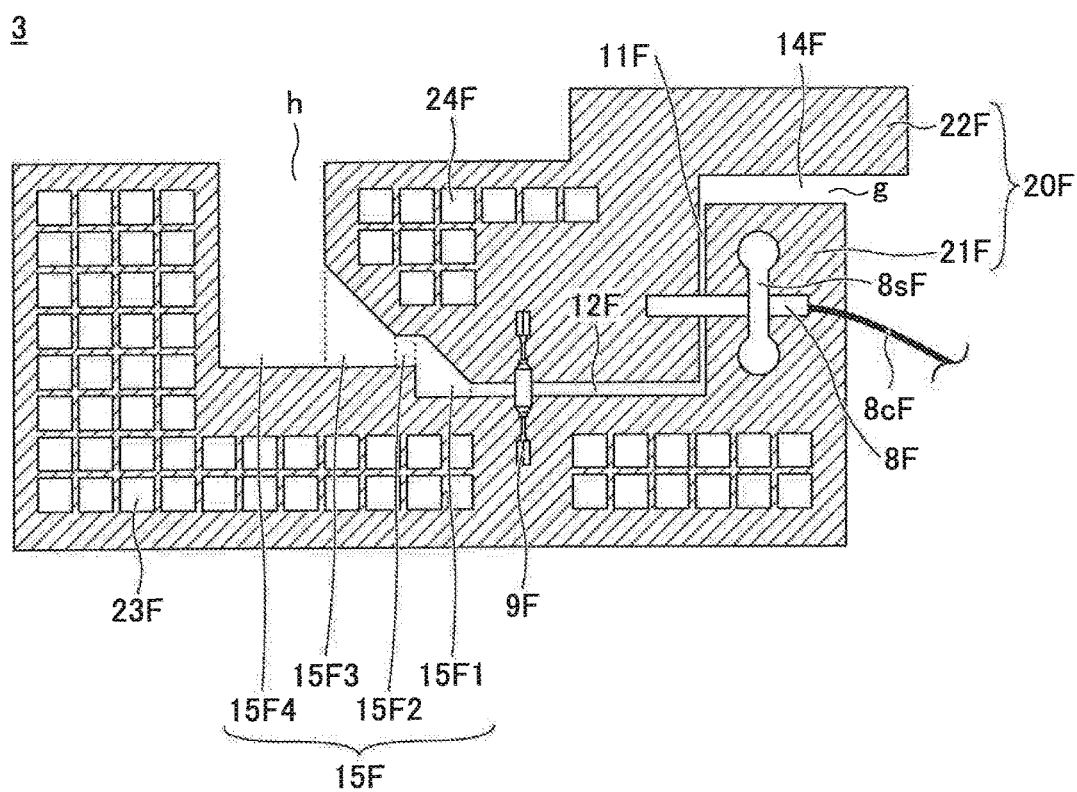
FIG. 14 is an enlarged view depicting an antenna obtained by arranging a resistor in the glass antenna illustrated in FIG. 13.

FIG. 14 is an enlarged view depicting an antenna obtained by arranging a resistor 9F and an on-glass connector for connecting coaxial cable (connector) 8F connected to a coaxial cable 8cF in the glass antenna illustrated in FIG. 13.

In the case of arranging the resistor 9 in the first embodiment, as illustrated in FIG. 5, the power supply unit 7 and the resistor 9 were arranged separated from each other.

In the ninth embodiment, because a size of a resistor module is small and a variation of an antenna characteristic is small when the resistor module is arranged on the antenna, the resistor 9F can be arranged near the power supply unit 7F to which the connector 8F is connected.

In the ninth embodiment, as described above, the connector 8F is soldered to the power supply unit 7F, which is arranged so as to straddle the first slot 11F, by the solder 8sF. In the connector 8F, an internal conductive body of the coaxial cable 8cF is connected and soldered to the core wire side conductive body 22F of the metallic film 20F, and an external conductive body, such as a braided wire, of the coaxial cable 8cF is connected and soldered to the ground side conductive body 21F.

In the ninth embodiment, the resistor 9F is arranged so as to straddle, not the second wide-width slot 15F, but the second slot 12F which is connected to the lower end of the first slot 11F.

Also in this configuration, the ground side conductive body 21F and the core wire side conductive body 22F of the metallic film 20F form a closed circuit with a route that includes the resistor 9F and is connected to the internal conductive body and to the external conductive body such as a braided wire, of the coaxial cable 8cF, which are connected to the connector 8F.

Also in the above-described configuration, when a predetermined range of resistance value cannot be obtained for a disconnection detection path circuit in which the core wire side conductive body 22F and the ground side conductive body 21F are connected to each other via the connector 8F and the resistor 9F by a communication device (not shown) installed in the vehicle and connected to the coaxial cable 8cF, it is detected that an antenna is not connected and that a communication cannot be performed.

Also in the ninth embodiment, similarly to the first embodiment, the resistor 9 can be used for connection detection in order to detect whether at least an antenna is connected.

Moreover, also in the ninth embodiment, grid-like cutout portions 23F, 24F may be formed in a part of the ground side conductive body 21F and the core wire side conductive body 22F where the power supply unit 7F and the resistor 9F are not arranged (See FIG. 14). In the case where the protrusion part from the core wire side conductive body 22F (upper right part in FIG. 14) is narrow, a cutout portion 24F may not be formed in the protrusion part, and a cutout portion 24F may be formed only in a part having a shape that is fit into a recess portion of the ground side conductive body 21F (a central part in FIG. 14). The formation of the cutout portions 23F and 24F is an example, and the cutout portion may be arranged in another part.

Tenth Embodiment

Figure 15:
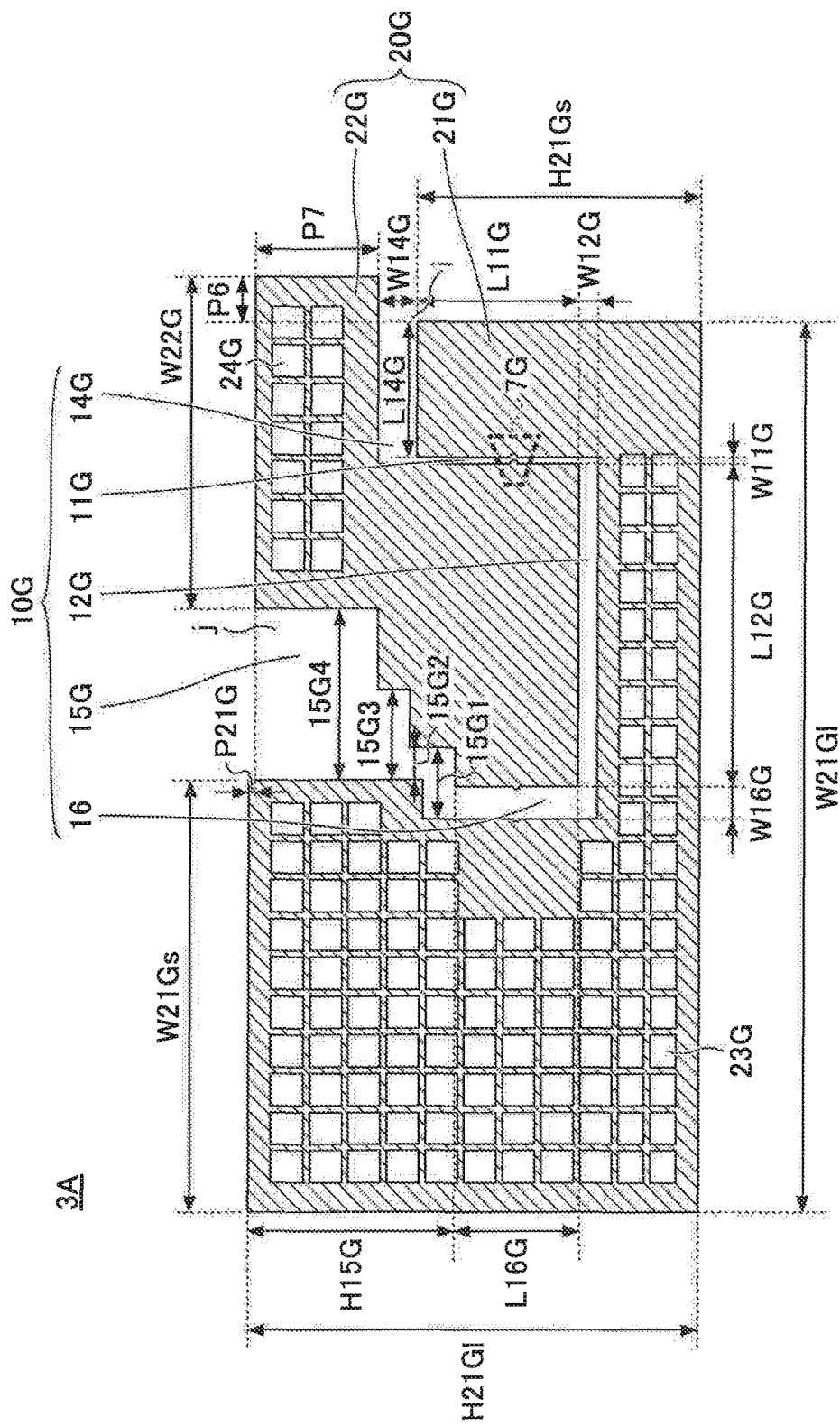
FIG. 15 is an enlarged view depicting a glass antenna according to a tenth embodiment.

FIG. 15 is an enlarged view depicting a glass antenna 3A according to the tenth embodiment arranged on a vehicle window glass 60.

The glass antenna 3A functions as a slot antenna by forming a cutout portion 10G in a metallic film (conductive film) 20G.

Specifically, in the metallic film 20G, a first slot 11G, a second slot 12G, a first wide-width slot 14G, and a second wide-width slot 15G are formed as cutout portions 10G.

Then, a power supply unit (power supply points) 7G is arranged so as to straddle the first slot 11G.

In the tenth embodiment, the metallic film 20G configuring the slot antenna opens in the side edge direction and opens upward. Specifically, as illustrated in FIG. 15, the first wide-width slot 14G opens to the side (right side in FIG. 15) close to the side edge portion 71b of the corner portion of the vehicle chassis 70 near to which the glass antenna 3A is arranged (opening "i").

Moreover, the second wide-width slot 15G opens to a side (upper side in FIG. 15) away from the lower edge portion 71c of the corner portion of the vehicle chassis 70 near to which the glass antenna 3A is arranged (opening "j").

The first slot 11G, which the power supply unit 7G is arranged to straddle, extends in an approximately up-down direction (first direction) from a lower end (one end) to an upper end (other end). In the tenth embodiment, the extension direction of the first slot 11G is an approximately vertical direction that is the first direction on a surface of the window glass 60.

The first wide-width slot 14G is connected to the other end (upper end) of the first slot 11G, and has a greater slot width than that of the first slot 11G. In the tenth embodiment, the first wide-width slot 14G extends in a direction different from the first direction. For example, the extension direction of the first wide-width slot 14G is an approximately horizontal direction, and a vehicle width direction (second direction).

The second slot 12G is connected to the one end (lower end) of the first slot 11G, and extends in an approximately horizontal direction different from the first direction, and in the vehicle width direction (second direction). FIG. 15 illustrates an example in which the extension direction of the second slot 12G is approximately parallel to the extension direction of the first wide-width slot 14G. The extension directions may be different from each other.

A second connection slot 16 is connected to the other end of the second slot 12G, and extends in a direction different from the second direction (fourth direction). In the tenth embodiment, the extension direction of the second connection slot 16 is approximately parallel to the first direction and is an approximately vertical direction.

The second wide-width slot 15G is connected to an end portion of the second connection slot 16 (terminal end portion of the second connection slot 16), and has a greater slot width than that of the second connection slot 16.

In the tenth embodiment, the slot width of the second wide-width slot 15G increases in a step-by-step manner from a constricted portion 15G2. Specifically, the second wide-width slot 15G according to the tenth embodiment includes a first wide-width portion 15G1, the constricted portion 15G2, a second wide-width portion 15G3, and a rectangular portion (third wide-width portion) 15G4.

The first wide-width portion 15G1 is connected to an end portion of the second connection slot 16, has a greater slot width than the second connection slot 16 in the horizontal direction, and extends in the vertical direction. The constricted portion 15G2 is connected to the end portion (upper end) of the first wide-width portion 15G1. The slot width is reduced by removing part of an increase in slot width, extending from the end portion of the second connection slot 16, of the first wide-width portion 15G1. The second wide-width portion 15G3 is connected to an end portion of the constricted portion 15G2 in which the slot width is partially narrowed, has a greater slot width than the constricted portion 15G2 in the horizontal direction, and extends in the vertical direction. The rectangular portion (a part opening upward) 15G4 is connected to an end portion (upper end) of the second wide-width portion 15G3, has a greater slot width than the second wide-width portion 15G3 in the horizontal direction, and extends upward forming a width of the opening "j" in a rectangular shape.

In the tenth embodiment, in the metallic film 20G, an approximately U-shaped conductive body below the second slot 12G and the first slot 11G functions as a ground side conductive body 21G. A conductive body, above the second slot 12G and the first slot 11G, and having a shape of a part which fits into a recess area of the U-shape, functions as a core wire side conductive body 22G.

Note that the shape of the metallic film 20G according to the tenth embodiment is not a rectangle. A part of the core wire side conductive body 22G projects (protrudes) to the side edge portion 71b side of the metallic chassis 70 with respect to the ground side conductive body 21G (right side in FIG. 15). Moreover, a part of the ground side conductive body 21G slightly projects upward with respect to the core wire side conductive body 22G.

By adjusting the positional relationship between the ground side conductive body 21G and the core wire side conductive body 22G or amounts of projection in the lateral direction and in the upward direction, the antenna characteristic of the glass antenna 3A can be controlled.

Configurations and attachment positions of a resistor, a connector and the like in the tenth embodiment are the same as those in the ninth embodiment.

Moreover, also in the tenth embodiment, grid-like cutout portions 23G, 24G may be formed in a part of the ground side conductive body 21G and the core wire side conductive body 22G where the power supply unit 7G and a resistor are not arranged. In the case where, as illustrated in FIG. 15, the recess portion of the U-shape in the ground side conductive body 21G is small, a cutout portion 24G may not be formed in the core wire side conductive body 22G that fits into the recess portion, and a cutout portion 24G may be formed only in the portion that projects from the recess portion (upper right portion in FIG. 15). The formation of the cutout portions 23G and 24G, described above, is an example, and the cutout portion may be arranged in another part.

In the ninth and tenth embodiments, a folding turnaround of slots (doubling) in the vertical direction (approximately vertical direction) does not exist. According to the configuration, the metallic films 20F, 20G configuring the slot antennas may be set to be horizontally long shapes, and lengths of the arrangement spaces in the vertical direction for the metallic films 20F, 20G forming the glass antennas 3, 3A can be reduced.

Even when the defogger 40 occupies the largest part of the window glass (rear glass) 60 in the up-down direction, the glass antenna 3 (3A) with an arrangement space that is small in the up-down direction can be arranged in a small margin region in the window glass 60 without deteriorating an appearance.

In each of the first to eighth embodiments, at least the second slot 12 and the second wide-width slot 15 (15B, 15C, 15D) extend in the approximately horizontal direction. Thus, in each of the embodiments, vertically polarized radio waves can be sent and received more easily.

Furthermore, in the case of using the tenth embodiment, because the second slot 12G and the first wide-width slot 14G extend in the approximately horizontal direction, vertically polarized radio waves can be sent and received more easily.

Furthermore, in the case of using the first to fourth embodiments and the ninth embodiment, because the second slot 12 (12F), the second wide-width slot 15 (15B, 15F) and the first wide-width slot 14 (14A, 14F) extend in the approximately horizontal direction, in each of the embodiments, vertically polarized radio waves can be sent and received more easily.

Moreover, in FIG. 3, an antenna for different use than the antenna according to the embodiment, for example an antenna for receiving broadcasting waves (TV, AM, FM, DTV, DAB, or the like) may be arranged on the rear glass. Alternatively, an antenna for remote keyless entry or an antenna for smart entry that locks and unlocks vehicle doors may be arranged on the rear glass.

As described above, in the case where a glass antenna for different use from the glass antenna according to the present invention is arranged on the rear glass, the glass antenna for different use is preferably arranged at a location separated from the glass antenna according to the present invention on the window glass. For example, in the case illustrated in FIG. 3, the glass antenna for different use is preferably arranged near the upper edge portion. In the case where the antenna according to the present invention is arranged near the upper edge portion, the antenna for different use is preferably arranged near the lower edge portion.

Moreover, in the embodiment described above, the glass antenna is configured by arranging on the window glass (rear glass) 60 for vehicle a metallic film (conductive film) that is a conductive body (e.g. a copper foil or a silver foil) in which the cutout portion 10 is formed by punching or etching. Furthermore, the glass antenna according to the present invention can be configured by printing using a screen plate in the same way as a conventional glass antenna or a defogger that is formed by baking a silver paste. In this case, the glass antenna according to the present invention can be formed collectively with another glass antenna or a defogger, and is excellent in mass productivity.

The glass antenna may be formed by arranging (attaching), at a predetermined location on either a vehicle interior surface or a vehicle exterior surface of a window glass, a synthetic resin film, a flexible circuit substrate or the like in which or on which a conductive layer including the above-described cutout portion is arranged. Note that arranging the synthetic resin film, the flexible circuit substrate or the like on the vehicle exterior surface is preferably limited to the case where a resin or the like covers a part of the window glass from the edge of the chassis. In another case, the synthetic resin film, the flexible circuit substrate or the like is preferably arranged on the vehicle interior surface in terms of visibility and durability.

Moreover, in order to control a rise in temperature in vehicle or to measure ultraviolet rays, there exists a window that is coated with a metallic layer of a thin film having a low UV transmittance and reflecting an IR ray of sunlight. In this case, the above-described cutout portion may be formed in a part of the thin film of the metallic layer so that the metallic layer functions as a glass antenna.

Moreover, in each of the first to tenth embodiments, components of the glass antenna and a connector and a resistor connected to the glass antenna are arranged on one surface of the window glass (preferably the vehicle interior surface).

Because the glass antenna can be formed only on one surface of the glass, the glass antenna is more excellent in production efficiency than the related art configured on both surfaces. The glass antenna according to the present invention can be attached to an existing vehicle glass later.

Furthermore, because the glass antenna is configured only on one surface, position adjustment for patterns on both surfaces is unnecessary.

As described above, the glass antenna and the window glass have been described by the plurality of embodiments. The present invention is not limited to the embodiments. Various variations and enhancements, such as combination/replacement with/by a part or a whole of another embodiment may be made without departing from the scope of the present invention.

The present invention is, as an antenna for communication waves used in a two-way communication, mainly used for a two-way communication in three bands (0.698 GHz to 0.96 GHz (Band 1), 1.71 GHz to 2.17 GHz (Band 2), and 2.4 GHz to 2.69 GHz (Band 3)) among the bands used for the LTE communication, or in the bands for ISM communication waves (0.863 GHz to 0.870 GHz, 0.902 GHz to 0.928 GHz, and 2.4 GHz to 2.5 GHz).

EXAMPLE

First Example

Electric Current Simulation According to the First Embodiment

An electric current distribution in the metallic film 20 will be described using results of simulation performed based on the FI (Finite Integration) method for the glass antenna according to the embodiment with parameter values set as described later.

A computer simulation (numerical calculation) was performed on a computer for an electric current distribution in the glass antenna 1, as a simulation model, illustrated in FIG. 5, and arranged on a glass representing the window glass 60.

In the shape of the glass antenna 1 illustrated in FIG. 5, dimensions were as follows (in units of mm):

L11 (slot length): 25.8,
W11 (slot line width): 2.7,
L12: 58.4,
W12: 2.7,
L13: 33.3,
W13: 2.7,
L14: 27.3,
W14: 26.0,
L15: 59.7,
Width of triangle part 15α of the second wide-width slot: 24.7,
Width of the wide-width connection part 15β of the second wide-width slot 15: 17.2,
Width of the resistor facing extension part 15γ of the second wide-width slot 15: 34.5,
Opening "d": 9.6,
Opening "f" (width of the resistor installation part 15δ of the second wide-width slot 15): 7.8,
Width of the linear ground side conductive body 21L: 0.8,
Vertical length of the metallic film 20: 50, and
Horizontal length of the metallic film 20: 132.7.

An angle of the terminal end of the first wide-width slot 14 was 94.5°, and an angle of the part where the second wide-width slot 15 gradually increases was 42.7°.

Moreover, the glass antenna used in the first example had a configuration in which grid like cutout portions 23, 24 having a dimension of 5 mm×5 mm or less, as illustrated in FIG. 5 were arranged. The cutout portions 23, 24 were arranged separated from slot end portions configuring respective slots in the metallic film 20 by at least 2.3 mm, and arranged separated from the sides of the metallic film 20, which has a rectangular shape, by at least 3 mm. Moreover, the cutout portions 23, 24 were not formed in a part where the power supply unit 7 was arranged and in a part where the resistor 9 was arranged, so that the cutout portions 23, 24 did not directly contact with the power supply unit 7 and the resistor 9.

With reference to FIGS. 16 to 19, the electric current distribution in the respective frequency bands based on the results of the simulation will be described. In FIGS. 16 to 19, the thicker an arrow is, the electric current concentrated on the arrow becomes greater accordingly.

Note that an intensity and a direction of an electric current shown in FIGS. 16 to 19 are an example, and a generated electric current changes its intensity and its direction periodically. Even when an intensity and a direction of an electric current vary, a position in the metallic film 20, at which the electric current flows, for a specific frequency, is unchanged.

Figure 16:
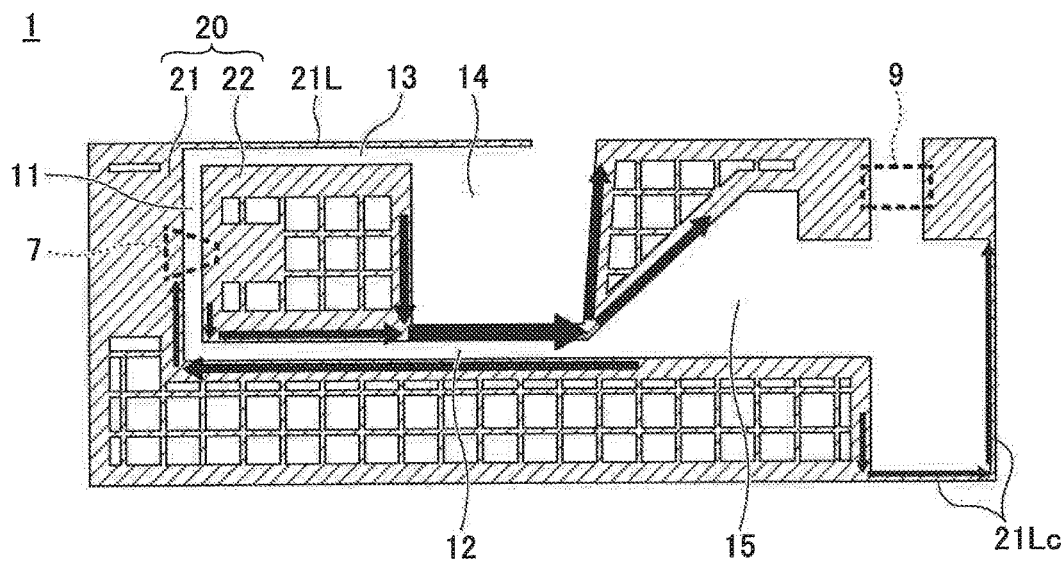
FIG. 16 is a diagram schematically depicting an electric current distribution in the case where a frequency is 0.698 GHz in the first embodiment.

FIG. 16 is a diagram (simulation diagram) schematically illustrating an electric current distribution at the frequency of 0.698 GHz (Band 1). When the frequency is 0.698 GHz, electric currents flow along the second slot 12, the first wide-width slot 14, and the second wide-width slot 15, and electromagnetic waves are radiated.

Figure 17:
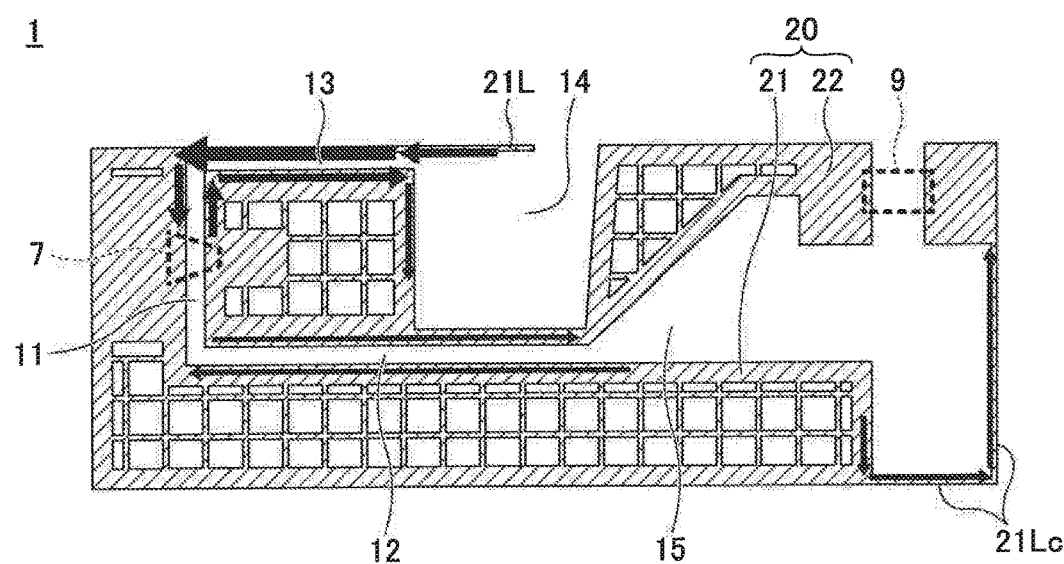
FIG. 17 is a diagram schematically depicting an electric current distribution in the case where a frequency is 0.83 GHz or 0.96 GHz in the first embodiment.

FIG. 17 is a diagram (simulation diagram) schematically illustrating an electric current distribution at the frequency of 0.83 GHz or 0.96 GHz (Band 1). When the frequency is 0.83 GHz or 0.96 GHz, electric currents flow along the first connection slot 13 and the first wide-width slot 14, and electromagnetic waves are radiated.

Figure 18:
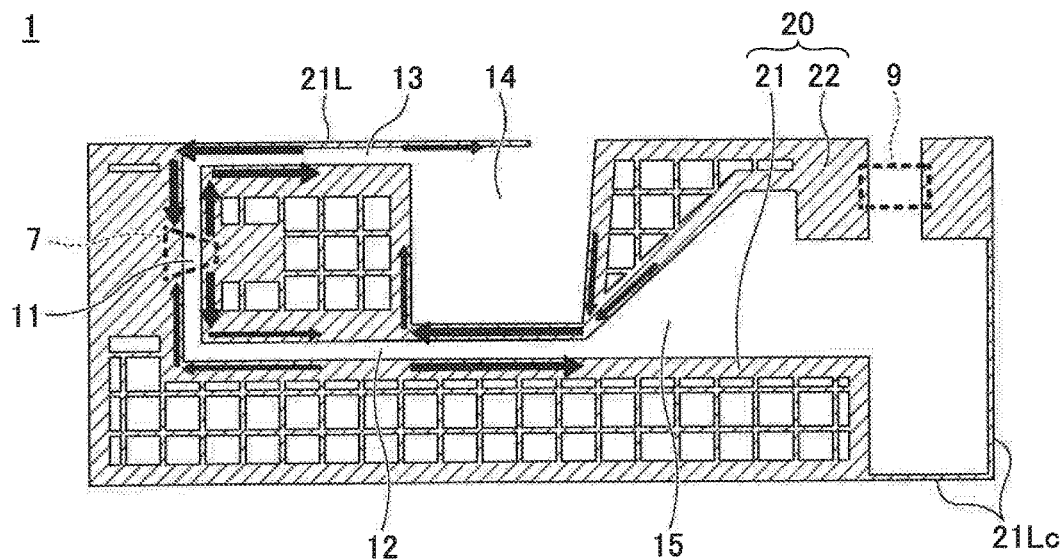
FIG. 18 is a diagram schematically depicting an electric current distribution in the case where a frequency is any one of 1.71 GHz, 1.94 GHz and 2.17 GHz in the first embodiment.

FIG. 18 is a diagram (simulation diagram) schematically illustrating an electric current distribution at the frequency of any one of 1.71 GHz to 2.17 GHz (Band 2). Electric currents at the frequencies of 1.71 GHz, 1.94 GHz and 2.17 GHz, respectively, exhibit the same intensity and the same direction. When the frequency is of Band 2, electric currents flow along peripheries of the first slot 11, the second slot 12, the first connection slot 13 and the first wide-width slot 14, and electromagnetic waves are radiated.

Figure 19:
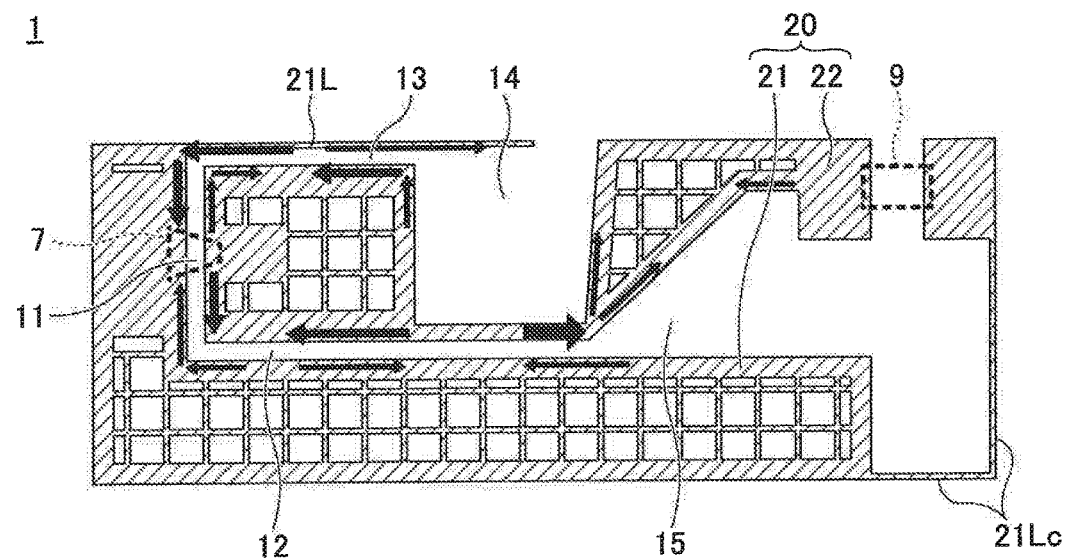
FIG. 19 is a diagram schematically depicting an electric current distribution in the case where a frequency is any one of 2.4 GHz, 2.545 GHz and 2.69 GHz in the first embodiment.

FIG. 19 is a diagram (simulation diagram) schematically illustrating an electric current distribution at the frequency of any one of 2.4 GHz to 2.69 GHz (Band 3). Electric current distributions at the frequencies of 2.4 GHz, 2.545 GHz and 2.69 GHz, respectively, are the same. When the frequency is of Band 3, electric currents flow along the first slot 11, the second slot 12, the first connection slot 13, the first wide-width slot 14, the second wide-width slot 15 and their peripheries, and electromagnetic waves are radiated.

As can be seen from the simulation diagrams in FIGS. 16 to 19, in the glass antenna 1 according to the embodiment, a plurality of slots having different lengths and different widths from each other are formed. Thus, the glass antenna 1 can perform communication as an antenna for wide frequency bands.

Figure 2:
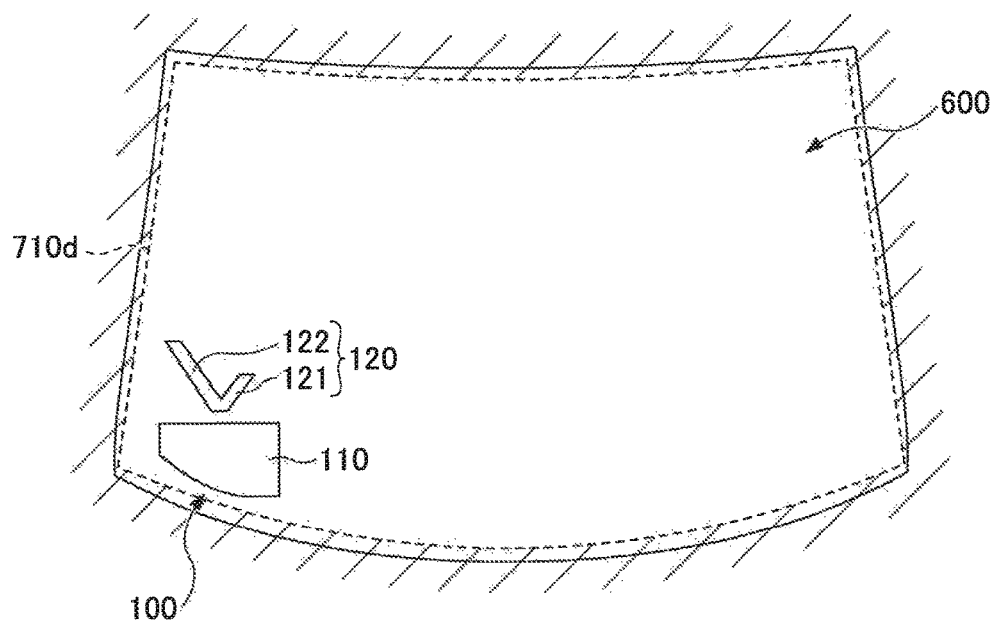
FIG. 2 is an overall view depicting a rear window glass on which a telephone antenna is arranged according to a related art 2.

Thus, the glass antenna according to the embodiment of the present invention, without affecting a design of the vehicle or an aerodynamic characteristic as in the related art illustrated in FIG. 1, can accommodate a plurality of bands and wide frequency bands. Furthermore, the glass antenna 1 is arranged adjacent to the outer periphery 61 of the window glass 60, and glass antenna 1 according to the embodiment can accommodate the wide frequency bands without deteriorating an appearance of the window glass, as in the related art illustrated in FIG. 2.

<Return Loss>

A return loss (reflection coefficient) was numerically calculated for a frequency within a range of 0.5 GHz to 3.0 GHz using results of an electromagnetic field simulation performed based on the FI method for the glass antenna according to the embodiment with parameter values set as described later, in the second to seventh examples as follows.

Typically, within a frequency band used for communication, the return loss is preferably −7 dB or less, and more preferably −10 dB or less.

Second Example

Return Loss by Simulation According to the First Embodiment

Figure 20:
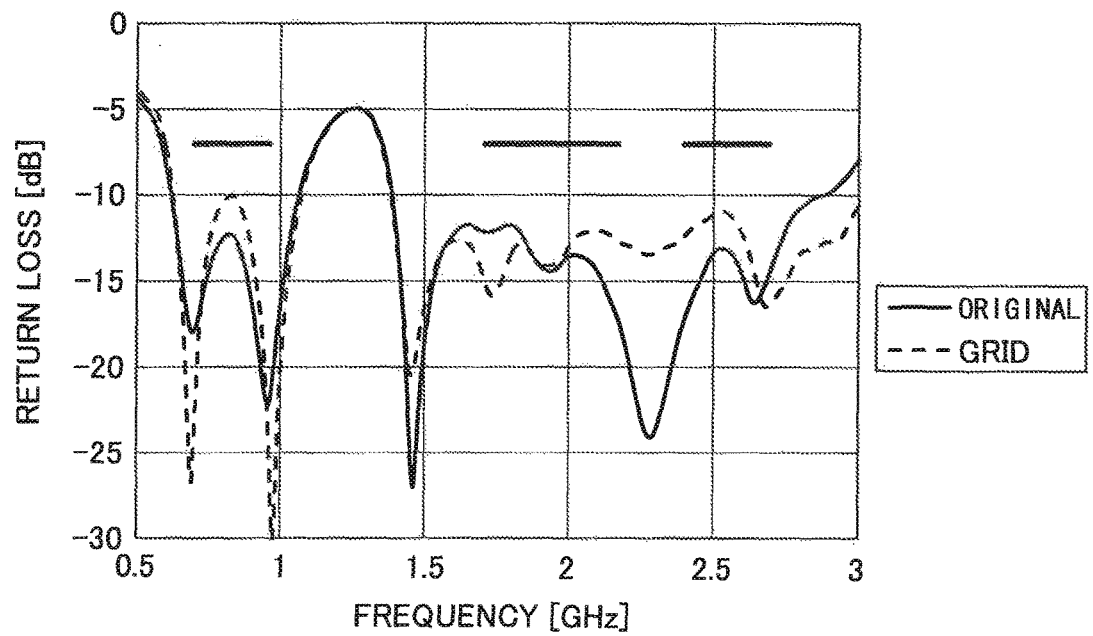
FIG. 20 is a diagram depicting a graph showing a return loss for the glass antenna according to the first embodiment illustrated in FIG. 4 and FIG. 5.

FIG. 20 is a diagram depicting results of simulation for a return loss of the glass antenna 1, illustrated in FIGS. 4 and 5, for a frequency used for communication.

A difference between two results in the explanatory note ("Original" and "Grid") is a presence or absence of the cutout portions (Grid) 23, 24 in the glass antenna 1 having the dimension illustrated in the first example.

As can be seen from FIG. 20, even when cutout portions 23, 24 are formed in each of the ground side conductive body 21 and the core wire side conductive body 22, the return loss, in the desired frequency bands of Band 1 to Band 3, is less than or equal to −7 dB, and the performance of the antenna is maintained.

Third Example

<Return Loss Obtained by Simulation when a Position of Power Supply Unit Changes>

Figure 21:
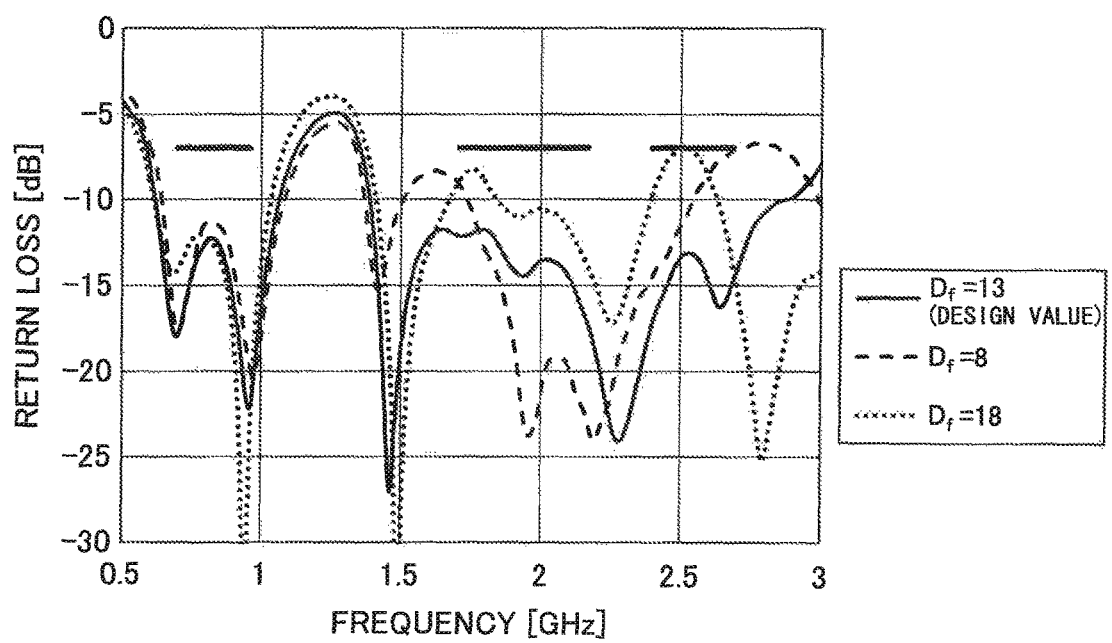
FIG. 21 is a diagram depicting a graph showing a return loss in the case where an arrangement position of the power supply unit is changed in the glass antenna according to the first embodiment.

FIG. 21 is a diagram illustrating a return loss for a frequency used for communication, when the arrangement position of the power supply unit 7 is changed in the glass antenna 1 according to the first embodiment.

In FIG. 21, $D_f$ represents a distance from a lower end portion "a" (See FIG. 4) of the first slot 11 to the power supply unit (Feeding Point) 7. When a design value $D_f$ is 13, a distance from an upper corner portion (upper end portion "b") to the power supply unit 7 is 12.8 mm. When the design value $D_f$ is 8, the distance from the upper corner portion to the power supply unit 7 is 17.8 mm. When the design value $D_f$ is 18, the distance from the upper corner portion to the power supply unit 7 is 7.8 mm.

As illustrated in FIG. 21, even if the position of the power supply unit 7 varies, in the desired frequency bands, i.e. Band 1 to Band 3, the performance of the antenna is maintained.

In the manufacturing process, even if the arrangement position of the power supply unit deviates from the power supply position of the design value ($D_f$ is 13 mm), the performance is maintained. Thus, the robustness for position can be enhanced.

Note that when the design value $D_f$ is less than 8 or greater than 18, the return loss does not satisfy the desired condition, i.e. less than −7 dB. Thus, the arrangement position of the power supply unit 7 preferably satisfies a relation, $8 < D_f < 18$, i.e. the power supply unit 7 is preferably separated from the upper and lower corner portions (end portions "a" and "b") by 8 mm or more, respectively.

Fourth Example

<Return Loss Estimated by Simulation when the Shape of the Wide-Width Slot is Changed>

Figure 22:
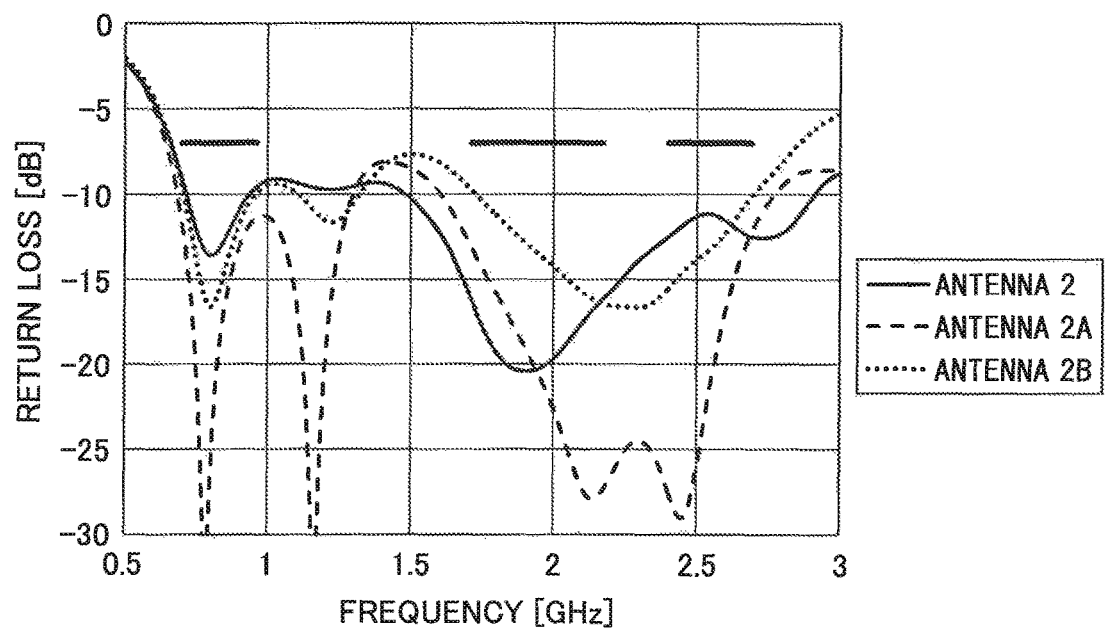
FIG. 22 is a diagram depicting a graph showing return losses in glass antennas in which the shapes of the wide-width slots are different from each other according to the fourth to sixth embodiments.

FIG. 22 is a diagram illustrating a return loss for a frequency used for communication in the glass antennas 2, 2A and 2B according to the fourth to sixth embodiments, having shapes of the wide-width slots different from each other.

The dimensions of respective members were as follows (in units of mm):

First Example: FIG. 8

L11C: 52,
W11C: 3,
L12C: 68,
W12C: 4,
L14C (triangle portion): 25,
L14C (rectangle portion): 25,
W14C: 60,
L15C (triangle portion): 31,
L15C (rectangle portion): 75, and
W15C: 104;

Second Example: FIG. 9

L11C: 44,
W11C: 2,
L12C: 70,
W12C: 4,
L14C (triangle portion): 26,
L14C (rectangle portion): 27,
W14C: 61,
L15D: 120, and
W15D: 63;

Third Example: FIG. 10

L11C: 50,
W11C: 3,
L12C: 62,
W12C: 4,
L14E: 47,
W14E: 52,
L15C (triangle portion): 29,
L15C (rectangle portion): 84, and
W15C: 72.

As can be seen from FIG. 22, even if the shape of the wide-width slot is changed to a shape of a quadrangle or to a shape obtained by combining a triangle and a rectangle, the performance of the antenna in the desired frequency bands, i.e. Band 1 to Band 3, is maintained.

Note that in the fourth example, the glass antennas 2, 2A and 2B have only one bending portion, respectively. Even if a glass antenna has two bending portions, the performance of the antenna is maintained in the same way as the glass antenna with one bending portion. As described in the first to third embodiments, the shape of a wide-width slot having two bending portions may be changed.

Fifth Example

<Return Loss Estimated by Simulation when the Bending Angle of Connection is Changed>

Figure 23:
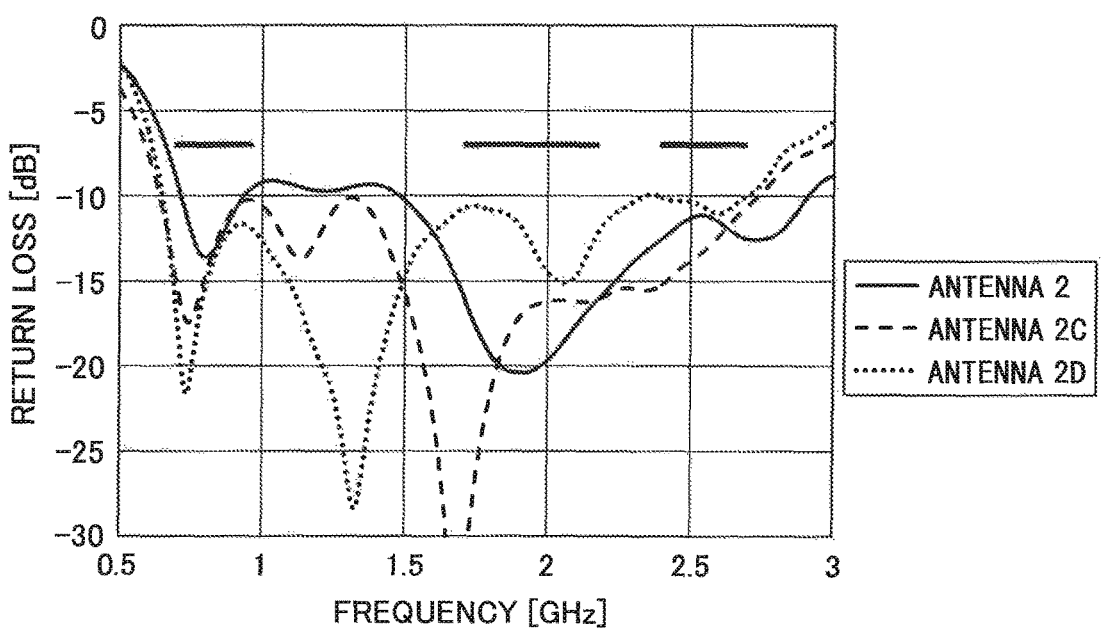
FIG. 23 is a diagram depicting a graph showing return losses in glass antennas in which bending angles are different from each other according to the fourth, seventh and eighth embodiments.

FIG. 23 is a diagram illustrating a return loss for a frequency used for communication in the glass antennas 2, 2C and 2D according to the fourth, seventh and eighth embodiments, with bending angles different from each other.

FIG. 23 illustrates the return loss of the glass antennas with the bending angle ($\theta_b$) that was changed from 60° (glass antenna 2D illustrated in FIG. 12), 90° (glass antenna 2 illustrated in FIG. 8), to 135° (glass antenna 2C illustrated in FIG. 11).

As can be seen from FIG. 23, even if the bending angle is changed to 60°, 90°, and 135°, the performance of the antenna in the desired frequency bands, i.e. Band 1 to Band 3, is maintained.

Accordingly, the bending angle may be changed in accordance with a shape of a flange of the window on which the glass antenna is arranged, arrangement positions of other members, or locations of the wiring.

Note that in the fifth example, the glass antennas each have one bending portion according to the fourth, seventh and eighth embodiments. The bending angles in the glass antennas each having two bending portions according to the first to third embodiments also may be changed in the same way as above.

Sixth Example

<Return Loss Estimated by Simulation when a Distance from the Metal Chassis is Changed>

Figure 24:
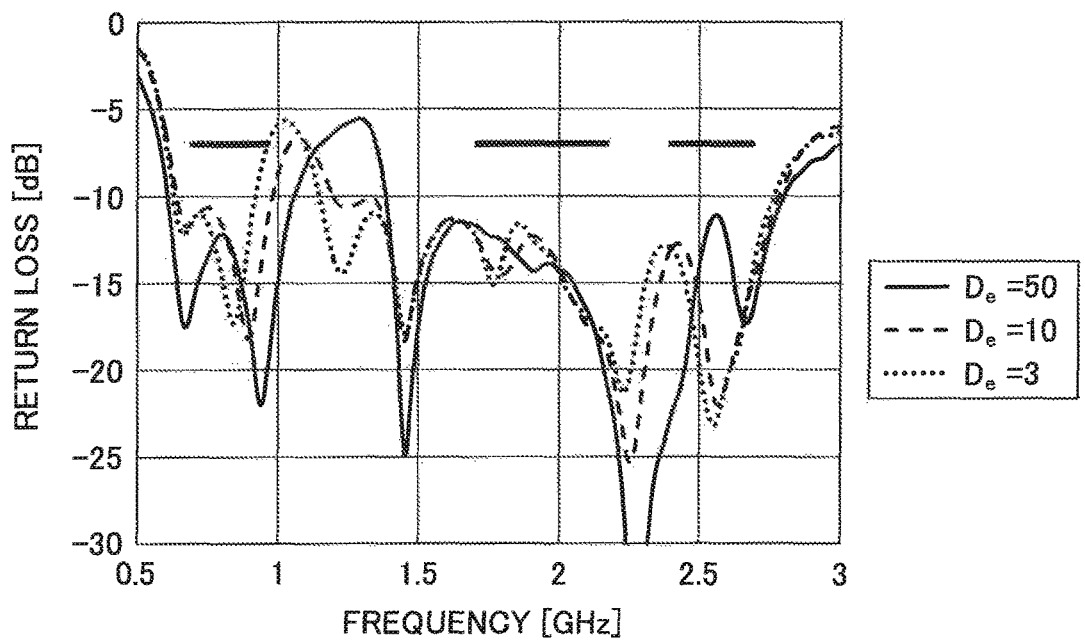
FIG. 24 is a diagram depicting a graph showing a return loss in the glass antenna according to the first embodiment in the case where a distance from a vehicle chassis is changed.

FIG. 24 is a diagram illustrating a return loss for a frequency used for communication in the glass antenna 1 according to the first embodiment, when a distance from the vehicle chassis 70, which is made of metal, is changed. For such a case, a simulation was performed for a model representing a simple glass and a chassis made of metal.

In FIG. 24, $D_e$ represents a distance between the lower edge 71c of the vehicle chassis 70 and the lower side of the metallic film 20 of the glass antenna 1. The distance $D_e$ was changed from 3 mm, 10 mm, to 50 mm.

As can be seen from FIG. 24, even if the position of the glass antenna 1 is changed by changing the distance $D_e$, the performance of the antenna in the desired frequency bands, i.e. Band 1 to Band 3, is maintained.

Different from an antenna configured of linear elements, the glass antenna 1 that is a slot antenna can be made close to the vehicle chassis 70 while maintaining the performance of the antenna in Band 1 to Band 3. For example, by arranging the glass antenna 1 near the lower edge portion of the rear glass, the glass antenna 1 is not liable to be seen by a passenger, and a window glass that is excellent in design can be obtained.

Note that in Band 1, as the position of the glass antenna 1 becomes closer to the lower edge portion 71c of the vehicle chassis 70, the value of the return loss tends to increase. Because the value of the return loss becomes close to −7 dB when the distance $D_e$ is 3 mm, the glass antenna 1 is more preferably separated from the lower edge portion 71c by 3 mm or more, as a design value.

Seventh Example

<Return Loss Estimated by Simulation when a Distance from a Metal Wire is Changed>

Figure 25:
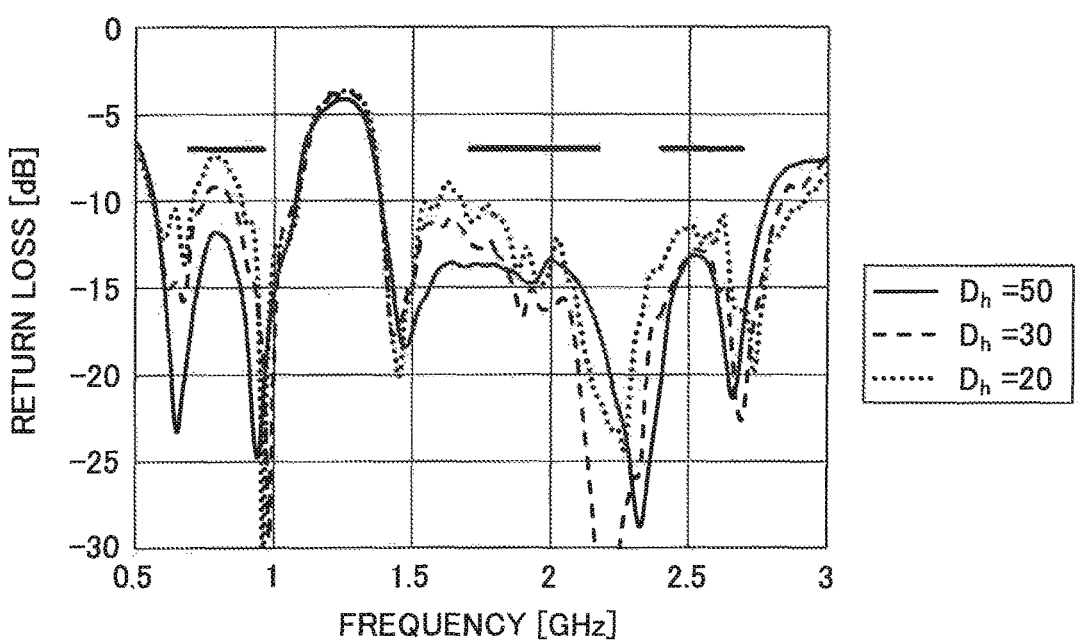
FIG. 25 is a diagram depicting a graph showing a return loss in the glass antenna according to the first embodiment in the case where a distance from a defogger is changed.

FIG. 25 is a diagram illustrating a return loss for a frequency used for communication in the glass antenna 1 according to the first embodiment, when a distance from the defogger is changed. For such a case, a simulation was performed for a model representing a simple glass and a heater wire made of metal arranged on a surface of the glass.

In FIG. 25, $D_h$ represents a distance between a heater wire arranged at the lowest position in the defogger (e.g. the heater wire 42c illustrated in FIG. 3) and the upper side of the metallic film 20 of the glass antenna 1. The distance $D_h$ was changed from 20 mm, 30 mm, to 50 mm.

As can be seen from FIG. 25, even if the position of the glass antenna 1 is changed by changing the distance $D_h$ from 20 mm, 30 mm, to 50 mm, the performance of the antenna in the desired frequency bands, i.e. Band 1 to Band 3, is maintained.

Note that in Band 1, as the position of the glass antenna 1 becomes closer to the defogger 40 (distance $D_h$), the value of the return loss tends to increase. Because the value of the return loss becomes close to −7 dB when the distance $D_h$ is 20 mm, the glass antenna 1 is more preferably separated from the heater wire 42c arranged at the lowest position in the defogger 40 by 20 mm or more.

Eighth Example

Return Loss by Actual Measurement According to the First Embodiment

Figure 26:
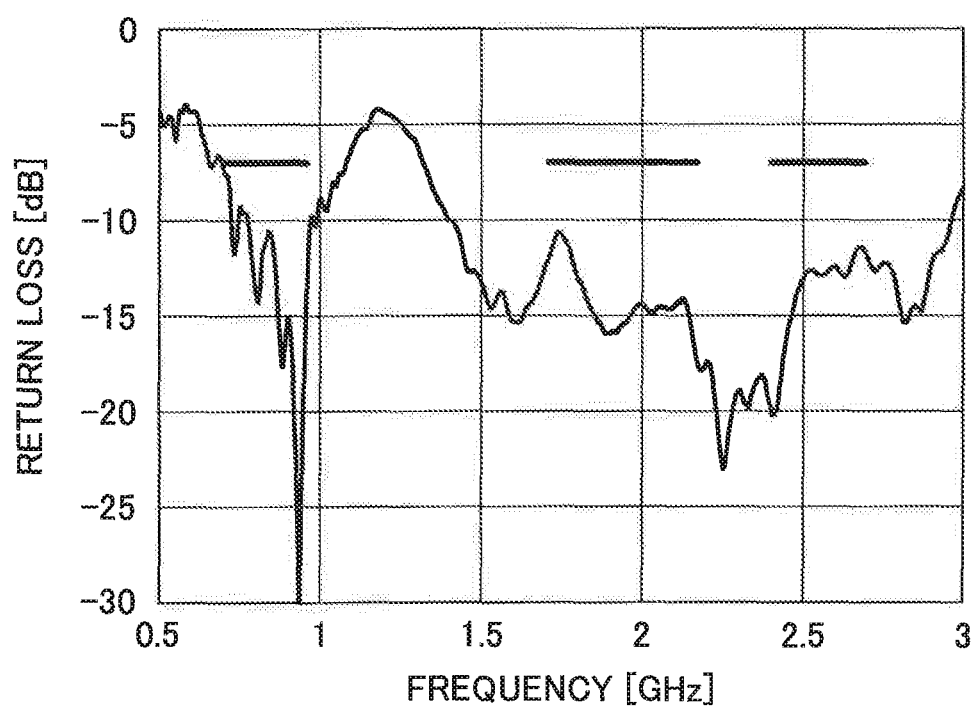
FIG. 26 is a diagram depicting a graph showing a measured value of the return loss in the glass antenna according to the first embodiment.

FIG. 26 is a diagram depicting a graph showing a return loss by actual measurement in the glass antenna 1 according to the first embodiment. The return losses shown in the second to seventh examples were the results of simulation for the configuration in which a glass antenna was arranged on a simple glass, separately from a vehicle. In FIG. 26, a window glass 60 was mounted in an actual vehicle chassis 70, the glass antenna 1 was arranged on the window glass 60, and the return loss was measured.

The dimensions of the glass antenna 1 were made to be the same as the first example.

In the measurement, the position where the glass antenna 1 was arranged on the window glass 60 was determined as follows: a distance from the lower edge portion 71c of the vehicle chassis 70 to a lower edge of the metallic film 20 was 6.0 mm, and a distance from a side edge portion 71d of the vehicle chassis 70 to a side edge of the metallic film 20 was 58.9 mm.

As shown in FIG. 26, the antenna performance in Band 1 to Band 3 that are the desired frequency bands is less than or equal to −7 dB. Thus, the desired performance of the antenna in the desired frequency bands can be obtained.

Even when an actual measurement is performed for the glass antenna 1 with the configuration of being arranged in the vehicle chassis 70, similarly to the simulation for a simple glass, a desired return loss can be obtained.

Ninth Example

Antenna Gain by Actual Measurement According to the First Embodiment

For the glass antenna for vehicle prepared by attaching to an actual vehicle window glass (rear glass) having the above-described configuration of glass antenna, results of actual measurement for an antenna gain will be described.

Figure 27:
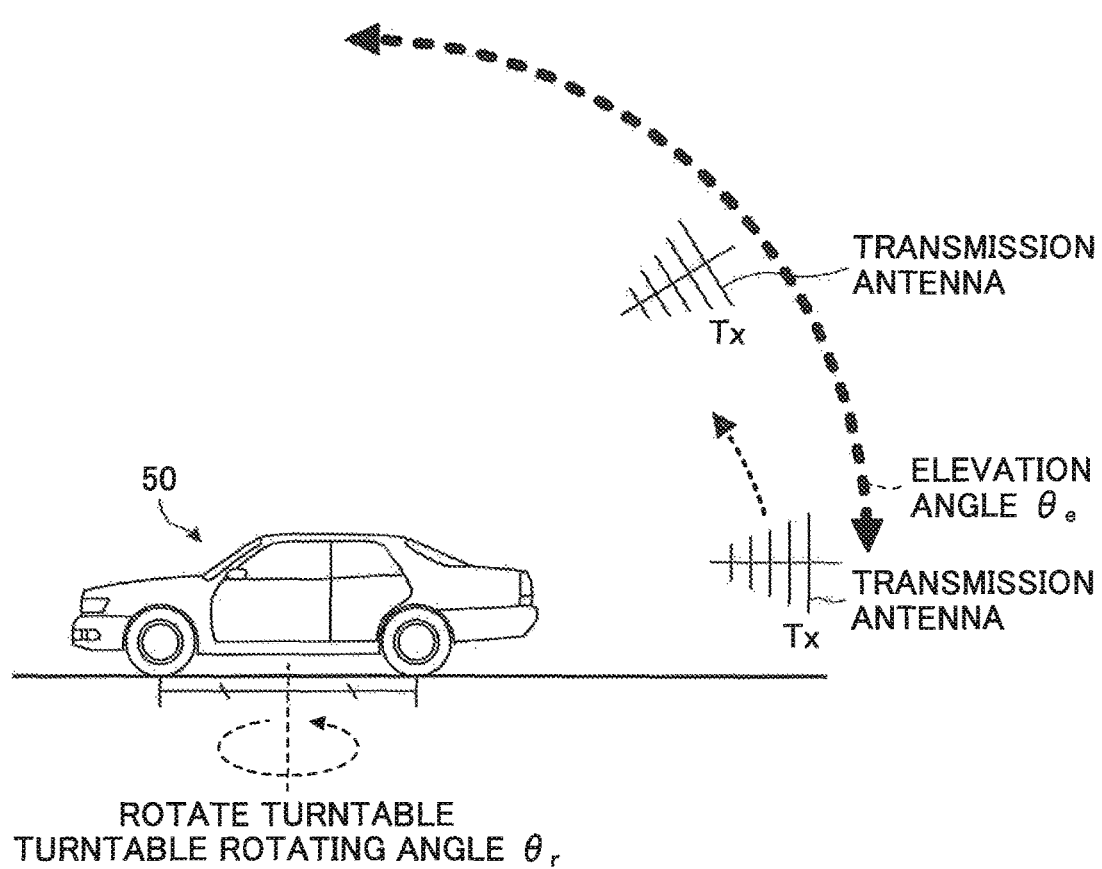
FIG. 27 is a diagram illustrating a state of the vehicle and the transmission antenna used for measurement.

FIG. 27 is a diagram schematically illustrating a condition for measurement, and depicting a state of a vehicle 50 and a transmission antenna Tx used in the measurement. Actual measurements of the antenna gain were performed for a vehicle window glass, on which a glass antenna is formed, assembled into a window frame of a vehicle on a turntable. At this time, the window glass was inclined at an angle of about 20° with respect to the horizontal plane.

The measurement was performed by setting a wheel axis center of the vehicle 50, to which the vehicle window glass with the glass antenna was assembled, both in the left and right direction and the fore and aft direction to a center of the turntable, and by rotating the vehicle by an angle in the horizontal direction up to 360°.

An antenna gain was measured within a predetermined frequency range every 10 MHz for frequency, every 2 degrees for turntable rotating angle $\theta_r$ from 0° to 360°, and every 2 degrees for transmission elevation angle $\theta_e$ from 0° to 30°. The elevation angle $\theta_e$ was defined so that a direction parallel to the ground surface was $\theta_e=0°$, and the zenith direction was $\theta_e=90°$. The antenna gain was indicated with an absolute gain by calibrating in advance the measurement system using a standard gain antenna.

Figure 28:
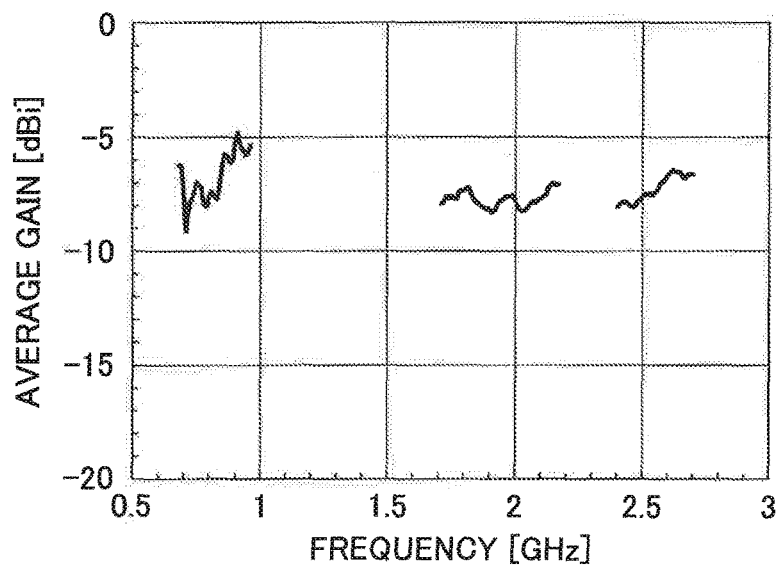
FIG. 28 is a diagram depicting a graph showing gain characteristics of a vertically polarized wave in the glass antenna according to the first embodiment.
Figure 29:
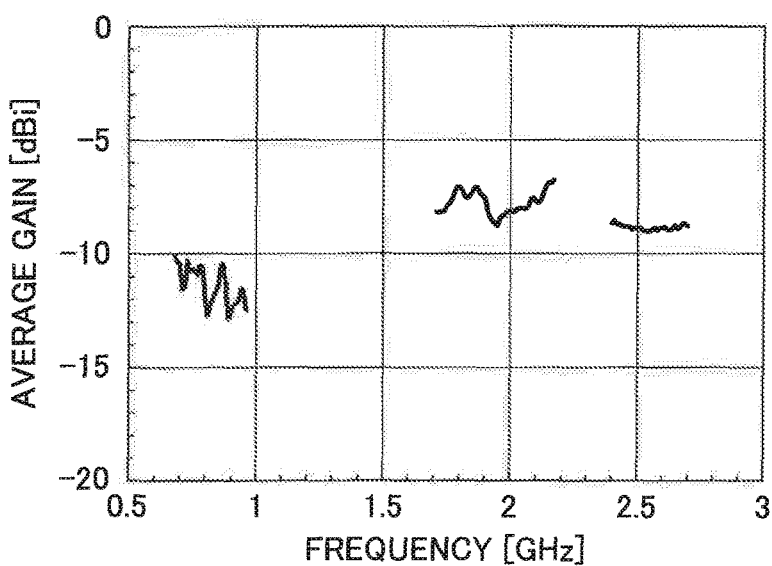
FIG. 29 is a diagram depicting a graph showing gain characteristics of a horizontally polarized wave in the glass antenna according to the first embodiment.

FIG. 28 shows a gain when a vertically polarized wave from the transmission antenna Tx was received by the glass antenna 1 (results of measurement for gain averaged over the rotational angle (whole circumferential) and the elevation angle). FIG. 29 shows a gain when a horizontally polarized wave from the transmission antenna Tx was received by the glass antenna 1. More specifically, the gain was measured for each elevation angle $\theta_e$ of the transmission antenna Tx, i.e. every 2° from 0° to 30°, rotating the vehicle 50 in the horizontal direction $\theta_r$ by 360° (every 2° from 0° to 360° (whole circumferential)), and averaging the measured data with respect to the rotating angle $\theta_r$ and the elevation angle $\theta_e$.

In the measurement for the gain shown in FIG. 28 and FIG. 29 in the present invention, the dimensions in the shape of the glass antenna 1 according to the embodiment, illustrated in FIG. 5, were the same as in the first example.

In the ninth example, as an example, for the resistor 9, a resistor of a resistance value of 100 kΩ with an error of ±5% (resistor module element) was used. Moreover, for the power supply unit 7, the on-glass connector for connecting coaxial cable 8 was used by soldering the connector.

TABLE 1

| | Antenna 1 | | | |
| --- | --- | --- | --- | --- |
| | vertical polarization | | | |
| | Band 1 (0.698~0.96 GHz) | Band 2 (1.71~2.17 GHz) | Band 3 (2.4~2.69 GHz) | 3 band average |
| average gain (dBi) | −6.6 | −7.7 | −7.2 | −7.2 |

TABLE 1 shows average gains for a vertically polarized wave received by the glass antenna 1 for communication waves in the three bands, of the gains of the communication waves as shown in FIG. 28, among the bands used as the LTE, i.e. 0.698 GHz to 0.96 GHz (Band 1), 1.71 GHz to 2.17 GHz (Band 2) and 2.4 GHz to 2.69 GHz (Band 3), and an average value of the gains of the three bands (arithmetic average value) denoted as "3 Band Average".

TABLE 2

| | Antenna 1 | | | |
|---|---|---|---|---|
| | horizontal polarization | | | |
| | Band 1 (0.698~0.96 GHz) | Band 2 (1.71~2.17 GHz) | Band 3 (2.4~2.69 GHz) | 3 band average |
| average gain (dBi) | −11.4 | −7.7 | −8.9 | −9.1 |

TABLE 2 shows average gains for a horizontally polarized wave received by the glass antenna 1, for the gains for communication waves in the three bands as shown in FIG. 29, and an average value of the gains of the three bands.

As can be seen from FIG. 28, FIG. 29, TABLE 1 and TABLE 2, in the glass antenna 1 according to the present invention, an average gain in three bands, Band 1, Band 2 and Band 3, i.e. an average value of the gains in the three bands is greater than or equal to −10 dBi, and an excellent average gain for receiving a vertically polarized wave and a horizontally polarized wave can be obtained.

Tenth Example

Electric Current Simulation According to the Ninth Embodiment

In the same way as the first example, a computer simulation (numerical calculation) was performed on a computer for an electric current distribution in the glass antenna 3 according to the ninth embodiment, as a simulation model, illustrated in FIG. 13, and arranged on a glass representing the window glass 60.

In the shape of the glass antenna 3 illustrated in FIG. 13, dimensions were as follows (in units of mm):

L11F (slot length): 26,
W11F (slot line width): 1.0,
L12F: 33.4,
W12F: 2.0,
L14F: 20.5,
W14F: 4.3,
W15F (width of the second wide-width slot 15F (length)): 36.9,
W15F1 (width of the first gradually increasing extension portion 15F1 (length)): 8.1,
Maximum height of the first gradually increasing extension portion 15F1: 9.0,
Height of the constricted portion 15F2: 4.5,
Height of the second gradually increasing extension portion 15F3: 15,
Height of the rectangular portion 15F4: 29.9,
W15F4 (width of the opening "h"): 15.6,
W21F1 (longer width of the ground side conductive body): 121.8,
W21Fs (shorter width of the ground side conductive body): 30,
H21F1 (longer height of the ground side conductive body): 56.5,
H21Fs (shorter height of the ground side conductive body): 50,
P1 (amount of projection in the lateral direction of the core wire side conductive body): 9.3,
P2 (width of the portion of the core wire side conductive body projected in the lateral direction): 12.7,
P3 (length of the portion of the core wire side conductive body projected in the upper direction): 49.5,
P4 (amount of projection in the upper direction of the core wire side conductive body): 10.5, and
P5: (length of the portion of the core wire side conductive body that is not projected): 36.

Moreover, also in the glass antenna used in the tenth example, grid-like cutout portions 23F, 24F having a dimension of 5 mm×5 mm or less were arranged. As illustrated in FIG. 14, the cutout portions 23F, 24F were arranged separated from slot end portions configuring respective slots in the metallic film 20F by at least 2.3 mm, and arranged separated from the sides of the metallic film 20F having a rectangular shape by at least 3 mm. Moreover, the cutout portions 23F, 24F were not formed in a part where the power supply unit 7F was arranged and in a part where the resistor 9F was arranged, so that the cutout portions 23F, 24F did not directly contact with the power supply unit 7F and the resistor 9F.

Figure 30:
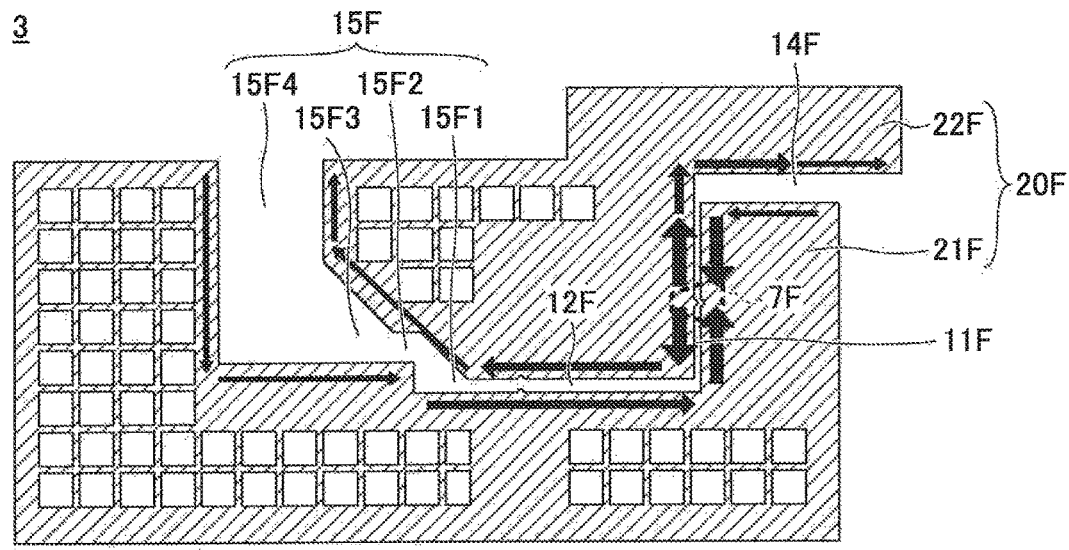
FIG. 30 is a diagram schematically depicting an electric current distribution in the case where a frequency falls within a range of 0.698 GHz to 0.96 GHz in a ninth embodiment.
Figure 31:
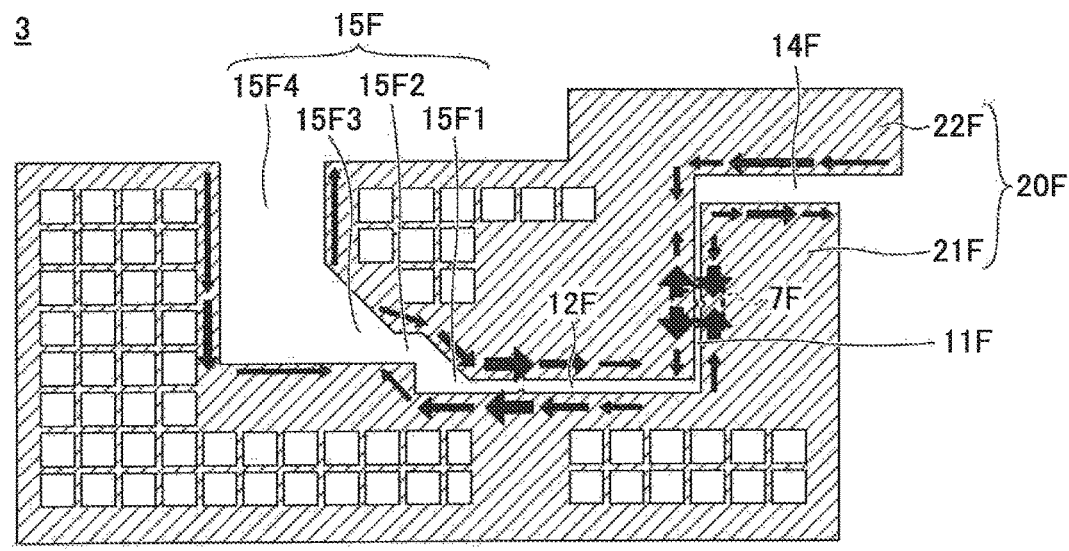
FIG. 31 is a diagram schematically depicting an electric current distribution in the case where a frequency falls within a range of 1.71 GHz to 2.17 GHz in the ninth embodiment.
Figure 32:
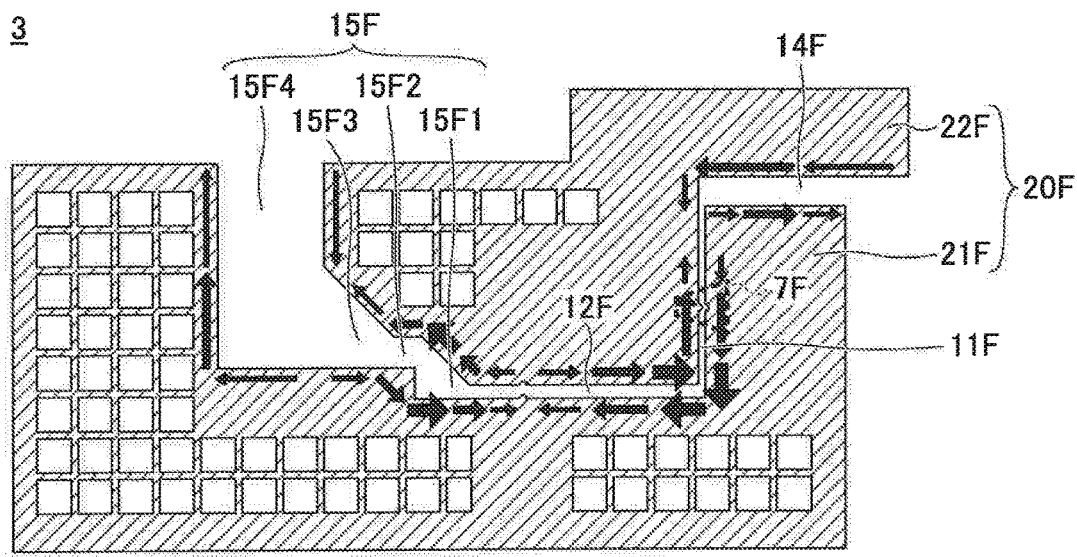
FIG. 32 is a diagram schematically depicting an electric current distribution in the case where a frequency falls within a range of 2.4 GHz to 2.69 GHz in the ninth embodiment.

With reference to FIGS. 30 to 32, the electric current distribution in the respective frequency bands based on the results of the simulation will be described. In FIGS. 30 to 32, the thicker an arrow is, the electric current concentrated on the arrow becomes greater accordingly.

Note that an intensity and a direction of an electric current shown in FIGS. 30 to 32 are an example, and a generated electric current changes its intensity and its direction periodically. Even when an intensity and a direction of an electric current vary, a position in the metallic film 20F, at which the electric current flows, for a specific frequency, is unchanged.

FIG. 30 is a diagram (simulation diagram) schematically illustrating an electric current distribution at the frequency of 0.698 GHz to 0.96 GHz (Band 1). FIG. 31 is a diagram schematically illustrating an electric current distribution at the frequency of 1.71 GHz to 2.17 GHz (Band 2). FIG. 32 is a diagram schematically illustrating an electric current distribution at the frequency of 2.4 GHz to 2.69 GHz (Band 3).

As can be seen from the simulation diagrams in FIGS. 30 to 32, in the glass antenna 3 according to the ninth embodiment, most of the electric currents flow along peripheries of slots extending with bending (the first wide-width slot 14F—the first slot 11F—the second slot 12F—the second wide-width slot 15F).

Comparing FIGS. 30 to 32 with each other, when the frequency illustrated in FIG. 30 is low (Band 1), electric currents distribute so that the intensity of electric current has a maximum value at around the power supply unit 7F (antinode of electric current) and the intensity of electric current gradually decreases toward the openings "g" and "h" that are the end portions of the entire slot; in other words, the slots 14F, 11F, 12F and 15F altogether form a distribution over half a wavelength.

In the case of Band 2, illustrated in FIG. 31, electric currents distribute so that the intensity of electric current has maximum values (antinodes of electric current) at around the power supply unit 7F, at around a terminal end of the second slot 12F, and at around the first wide-width slot 14F, and the intensity of electric current gradually decreases toward portions (nodes) between the antinodes and the openings "g" and "h", i.e. nodes and antinodes are repeated a plurality of times.

In the case of Band 3, illustrated in FIG. 32, electric currents distribute so that the intensity of electric current has maximum values (antinodes of electric current) at around the power supply unit 7F, at around the connection portion of the first slot 11F and the second slot 12F, at around the first gradually increasing extension portion 15F1 and the constricted portion 15F2 of the second wide-width slot 15F, and at around a portion of the first wide-width slot 14F near the first slot 11F, and the intensity of electric current gradually decreases toward portions (nodes) between the antinodes and the opening "g" and "h", i.e. nodes and antinodes are repeated with a shorter cycle than that in FIG. 31.

In the glass antenna 3 according to the ninth embodiment, electric currents flow intensively at around bending portions of slots so that the bending portion or a portion, at which a slot width changes, resonates at a frequency of the targeted frequency band. Thus, the glass antenna 3 can operate as an antenna for a wide frequency band.

The glass antenna 3 according to the ninth embodiment can accommodate a wide frequency band of a plurality of bands without affecting a design of the vehicle or an aerodynamic characteristic in a small space in the up-down direction.

Eleventh Example

<Return Loss by Actual Measurement for the Glass Antenna 3>

Figure 33:
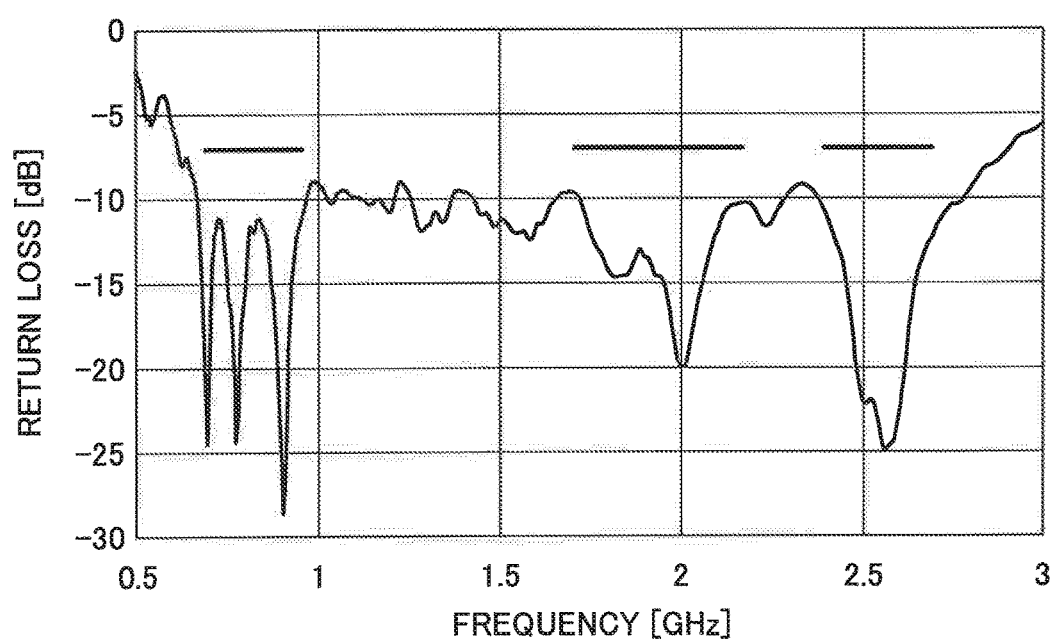
FIG. 33 is a diagram depicting a graph showing a measured value of the return loss in the glass antenna according to the ninth embodiment.

FIG. 33 is a diagram depicting a graph showing a measured value of a return loss for the glass antenna 3 according to the ninth embodiment. In the eleventh example, in the same way as the eighth embodiment, illustrated in FIG. 26, a window glass 60 was mounted in an actual vehicle chassis 70, the glass antenna 3 was arranged on the window glass 60, and the return loss was measured. Note that the vehicle used in the eighth example is different from the vehicle used in the eleventh example.

The dimensions of the glass antenna 3 were the same as in the tenth example.

In the measurement, the position where the glass antenna 3 was arranged on the window glass 60 was determined as follows: a distance from a lower edge of the window glass 60 along the lower edge portion 71c of the vehicle chassis 70 to a lower edge of the metallic film 20F was 51.5 mm, and a distance from a side edge of the window glass 60 along a side edge portion 71d of the vehicle chassis 70 to a side edge of the metallic film 20F was 116 mm.

As shown in FIG. 33, in the desired frequency band of Band 1 to Band 3, the return loss is less than or equal to −7 dB. Thus, a desired performance of the antenna can be obtained in the desired frequency band.

It was found that when an actual measurement was performed for the configuration in which the glass antenna 3 is arranged on the vehicle chassis 70, a desired return loss can be obtained.

Twelfth Example

Antenna Gain by Actual Measurement According to the Ninth Embodiment

For the glass antenna for vehicle prepared by attaching the glass antenna having the above-described configuration of glass antenna to an actual vehicle window glass (rear glass), results of actual measurement for an antenna gain will be described.

The condition for experiment was the same as the condition illustrated in FIG. 27. Note that in the twelfth example, the window glass was inclined at an angle of about 21° with respect to the horizontal plane.

Figure 34:
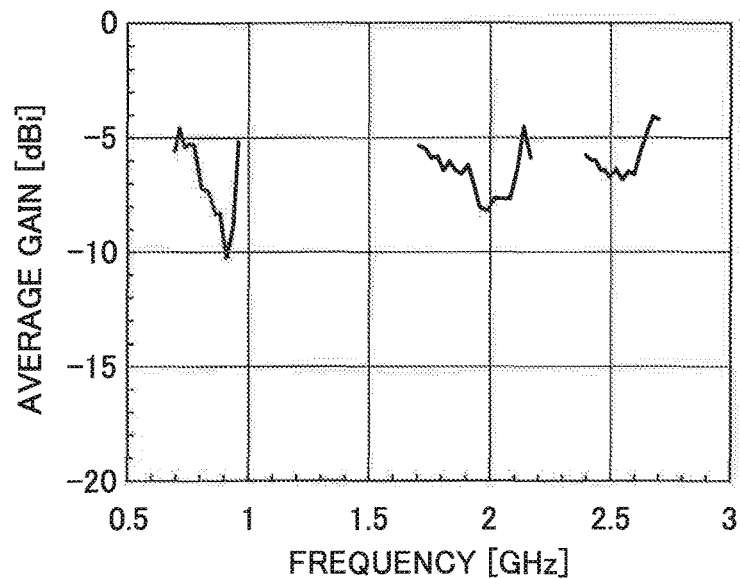
FIG. 34 is a diagram depicting a graph showing gain characteristics of a vertically polarized wave in the glass antenna according to the ninth embodiment.
Figure 35:
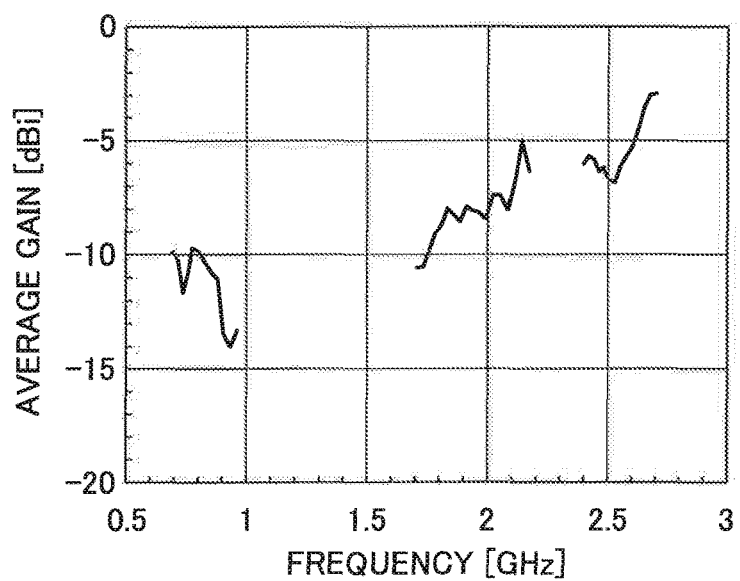
FIG. 35 is a diagram depicting a graph showing gain characteristics of a horizontally polarized wave in the glass antenna according to the ninth embodiment.

FIG. 34 shows a gain when a vertically polarized wave from the transmission antenna Tx was received by the glass antenna 3 (results of measurement for gain averaged over the rotational angle (whole circumferential) and the elevation angle). FIG. 35 shows a gain when a horizontally polarized wave from the transmission antenna Tx was received by the glass antenna 3. More specifically, the gain was measured for each elevation angle $\theta_e$ of the transmission antenna Tx, i.e. every 2° from 0° to 30°, rotating the vehicle 50 (See FIG. 27) in the horizontal direction $\theta_r$ by 360° (every 2° from 0° to 360° (whole circumferential)), and averaging the measured data with respect to the rotating angle $\theta_r$ and the elevation angle $\theta_e$.

In the measurement for the gain shown in FIG. 34 and FIG. 35 in the twelfth example, the dimensions in the shape of the glass antenna 3 according to the ninth embodiment, illustrated in FIG. 13, were the same as in the tenth example.

In the twelfth example, as an example, for the resistor 9F, a resistor of a resistance value of 100 kΩ with an error of ±5% (resistor module element) was used. Moreover, for the power supply unit 7F, the on-glass connector for connecting coaxial cable 8F was used by soldering the connector.

TABLE 3

| | Antenna 3 | | | |
| --- | --- | --- | --- | --- |
| | vertical polarization | | | |
| | Band 1 (0.698~0.96 GHz) | Band 2 (1.71~2.17 GHz) | Band 3 (2.4~2.69 GHz) | 3 band average |
| average gain (dBi) | −6.8 | −6.5 | −5.9 | −6.4 |

TABLE 3 shows average gains for a vertically polarized wave received by the glass antenna 3 for communication waves in the three bands, of the gains of the communication waves as shown in FIG. 34, among the bands used as the LTE, Band 1, Band 2, and Band 3, and an average value of the gains of the three bands.

TABLE 4

| | Antenna 3 | | | |
| --- | --- | --- | --- | --- |
| | horizontal polarization | | | |
| | Band 1 (0.698~0.96 GHz) | Band 2 (1.71~2.17 GHz) | Band 3 (2.4~2.69 GHz) | 3 band average |
| average gain (dBi) | −11.3 | −8.2 | −5.4 | −8.3 |

TABLE 4 shows average gains for a horizontally polarized wave received by the glass antenna 3, for the gains for communication waves in the three bands as shown in FIG. 35, and an average value of the gains of the three bands.

As can be seen from FIG. 34, FIG. 35, TABLE 3 and TABLE 4, in the glass antenna 3, illustrated in FIG. 13, according to the present invention, an average gain in three bands, Band 1, Band 2 and Band 3, i.e. an average value of the gains in the three bands is greater than or equal to −10 dBi, and an excellent average gain for receiving a vertically polarized wave and a horizontally polarized wave can be obtained.

Thirteenth Example

Return Loss by Actual Measurement According to the Tenth Embodiment

Figure 36:
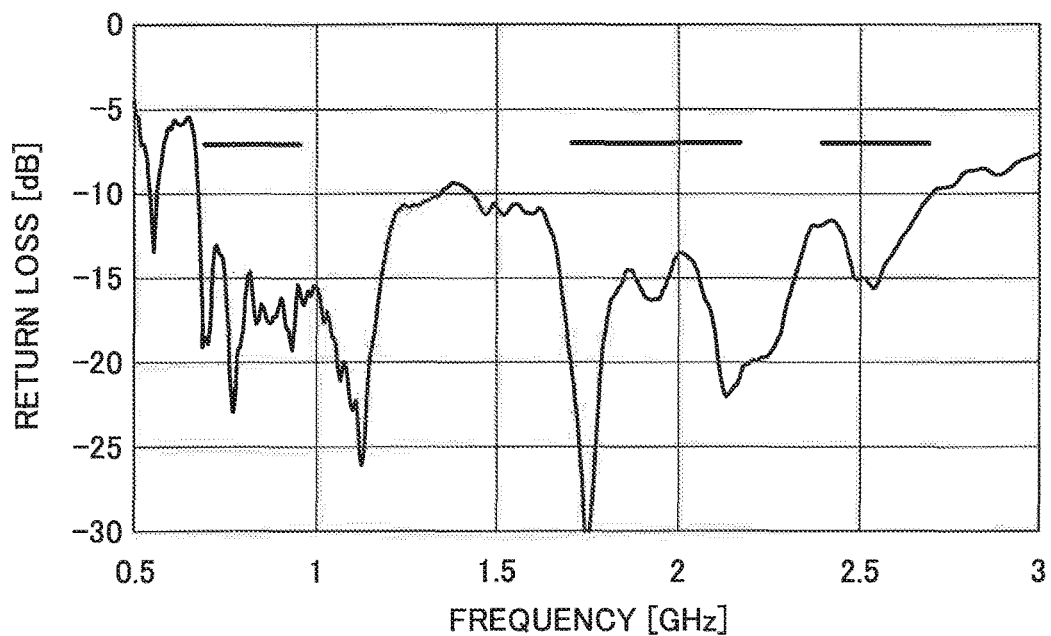
FIG. 36 is a diagram depicting a graph showing a measured value of the return loss in the glass antenna according to a tenth embodiment.

FIG. 36 is a diagram depicting a graph showing a measured value of a return loss for the glass antenna 3A according to the tenth embodiment. In the thirteenth example, in the same way as the eleventh example, illustrated in FIG. 33, a window glass 60 was mounted in an actual vehicle chassis 70, the glass antenna 3A was arranged on the window glass 60, and the return loss was measured. Note that the vehicle used in the thirteenth example is the same as the vehicle used in the eleventh example (See FIG. 27).

In the thirteenth example, in the shape of the glass antenna 3A according to the tenth embodiment, illustrated in FIG. 15, dimensions were as follows (in units of mm):

L11G (slot length): 25,
W11G (slot line width): 1.0,
L12G: 50,
W12G: 3.0,
L14G: 21,
W14G: 6,
L16: 19,
W16: 5,
H15G (height of the second wide-width slot): 32,
Width of the first wide-width portion 15G1: 11,
Width of the constricted portion 15G2: 5,
Width of the second wide-width portion 15G3: 14,
Width of the rectangular portion 15G4 (width of the opening "j"): 26.5,
W21G1 (longer width of the ground side conductive body): 138.0,
W21Gs (shorter width of the ground side conductive body): 67,
H21G1 (longer height of the ground side conductive body): 70,
H21Gs (shorter height of the ground side conductive body): 44.0,
P21G (amount of projection of the ground side conductive body): 1.0,
P6 (amount of projection in the lateral direction of the core wire side conductive body): 6.5,
P7 (width of the portion of the core wire side conductive body projected in the lateral direction): 19, and
W22G (width of the upper portion of the core wire side conductive body): 51.5.

In the measurement, the position where the glass antenna 3A was arranged on the window glass 60 was determined as follows: a distance from a lower edge of the window glass 60 along the lower edge portion 71c of the vehicle chassis 70 to a lower edge of the metallic film 20G was 57.7 mm, and a distance from a side edge of the window glass 60 along a side edge portion 71d of the vehicle chassis 70 to a side edge of the metallic film 20G was 120 mm.

As shown in FIG. 36, in the desired frequency band of Band 1 to Band 3, the return loss is less than or equal to −7 dB. Thus, a desired performance of the antenna can be obtained in the desired frequency band.

It was found that when an actual measurement was performed for the configuration in which the glass antenna 3A is arranged on the vehicle chassis 70, a desired return loss can be obtained.

Fourteenth Example

Antenna Gain by Actual Measurement According to the Tenth Embodiment

For the glass antenna for vehicle prepared by attaching the glass antenna 3A, illustrated in FIG. 15, to an actual vehicle window glass (rear glass), results of actual measurement for an antenna gain will be described.

The condition for experiment was the same as the condition illustrated in FIG. 27. Note that in the fourteenth example, the window glass was inclined at an angle of about 21° with respect to the horizontal plane.

Figure 37:
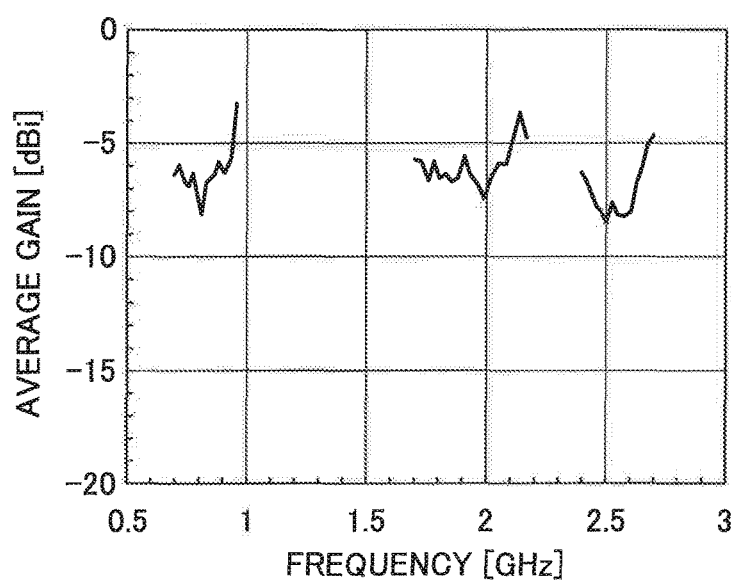
FIG. 37 is a diagram depicting a graph showing gain characteristics of a vertically polarized wave in the glass antenna according to the tenth embodiment.
Figure 38:
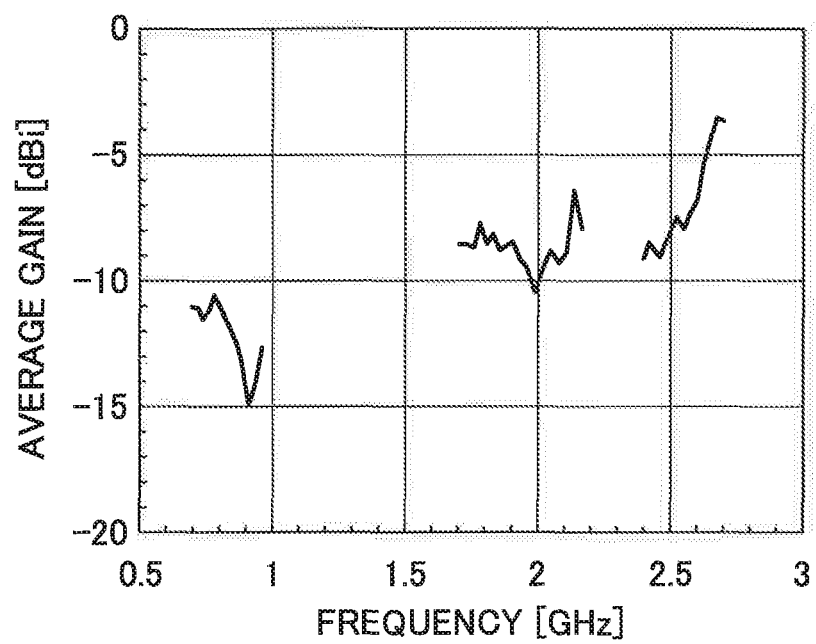
FIG. 38 is a diagram depicting a graph showing gain characteristics of a horizontally polarized wave in the glass antenna according to the tenth embodiment.

FIG. 37 shows a gain when a vertically polarized wave from the transmission antenna Tx was received by the glass antenna 3A (results of measurement for gain averaged over the rotational angle (whole circumferential) and the elevation angle). FIG. 38 shows a gain when a horizontally polarized wave from the transmission antenna Tx was received by the glass antenna 3A. More specifically, the gain was measured for each elevation angle $\theta_e$ of the transmission antenna Tx, i.e. every 2° from 0° to 30°, rotating the vehicle 50 (See FIG. 27) in the horizontal direction $\theta_r$ by 360° (every 2° from 0° to 360° (whole circumferential)), and averaging the measured data with respect to the rotating angle $\theta_r$ and the elevation angle $\theta_e$.

In the measurement for the gain shown in FIG. 37 and FIG. 38 in the present invention, the dimensions in the shape of the glass antenna 3A according to the tenth embodiment, illustrated in FIG. 15, were the same as in the thirteenth example.

In the fourteenth example, as an example, for the resistor, a resistor of a resistance value of 100 kΩ with an error of ±5% (resistor module element) was used. Moreover, for the power supply unit 7G, the on-glass connector for connecting coaxial cable was used by soldering the connector.

TABLE 5

| | Antenna 3A | | | |
|---|---|---|---|---|
| | vertical polarization | | | |
| | Band 1 (0.698~0.96 GHz) | Band 2 (1.71~2.17 GHz) | Band 3 (2.4~2.69 GHz) | 3 band average |
| average gain (dBi) | −6.2 | −6.0 | −7.1 | −6.4 |

TABLE 5 shows average gains for a vertically polarized wave received by the glass antenna 3A for communication waves in the three bands, of the gains of the communication waves as shown in FIG. 37, among the bands used as the LTE, Band 1, Band 2, and Band 3, and an average value of the gains of the three bands.

TABLE 6

| | Antenna 3A | | | |
|---|---|---|---|---|
| | horizontal polarization | | | |
| | Band 1 (0.698~0.96 GHz) | Band 2 (1.71~2.17 GHz) | Band 3 (2.4~2.69 GHz) | 3 band average |
| average gain (dBi) | −12.1 | −8.7 | −7.1 | −9.3 |

TABLE 6 shows average gains for a horizontally polarized wave received by the glass antenna 3A, for the gains for communication waves in the three bands as shown in FIG. 38, and an average value of the gains of the three bands.

As can be seen from FIG. 37, FIG. 38, TABLE 5 and TABLE 6, in the glass antenna 3A, according to the present invention, an average gain of the three bands, Band 1, Band 2 and Band 3, i.e. an average value of the gains of the three bands is greater than or equal to −10 dBi, and an excellent average gain for receiving a vertically polarized wave and a horizontally polarized wave can be obtained.

In addition, typically, a communication wave has a high tolerance of noise, frequency of the communication wave is higher than a broadcast wave, and the frequency is substantially different from that of signals used in an electronic device. Thus, even if the glass antenna is arranged near a wiper or the like, a return loss and a value of a gain will not greatly receive an influence.

As described above, the glass antenna and the window glass for vehicle have been described by the embodiments and examples. The present invention is not limited to the embodiments or examples. Various variations and enhancements, such as combination/replacement with/by a part or a whole of the other embodiment or example may be made without departing from the scope of the present invention.

REFERENCE SIGNS LIST 1, 1A, 1B, 2, 2A, 2B, 2C, 2D, 3, 3A glass antenna
10, 10F, 10G cutout portion
11, 11C, 11F, 11G first slot
12, 12C, 12F, 12G second slot
13 first connection slot
14, 14A, 14C, 14E, 14F, 14G first wide-width slot
15, 15B, 15C, 15D, 15F, 15G second wide-width slot
15F2, 15G2 constricted portion
15F4, 15G4 rectangular portion (portion that opens upward)
16 second connection slot
20, 20F, 20G metallic film (conductive film)
21, 21F, 21G ground side conductive body
22, 22F, 22G core wire side conductive body
23, 24, 23F, 24F, 23G, 24G cutout portion
7, 7F, 7G power supply slot
8, 8F on-glass connector for connecting coaxial cable (connector)
8c, 8cF coaxial cable
8s, 8sF solder
9, 9F resistor
40 defogger
41 bus bar
42 heater wire (heating wire)
50 vehicle
60 window glass (rear glass, vehicle window glass)
61 outer periphery of window glass
65 shielding portion (shielding film)
70 vehicle chassis
71c lower edge portion of vehicle chassis (body flange)
71d side edge portion of vehicle chassis
a one end of first slot
b other end of first slot
c width changing portion
d opening of first wide-width slot
e end portion (width changing portion, terminal end portion of extending)
f opening of second wide-width slot (resistor arrangement portion)
g opening of first wide-width slot
h opening of second wide-width slot
i opening of third wide-width slot
j opening of fourth wide-width slot

What is claimed is:

1. A glass antenna arranged on a vehicle window glass comprising:
   a slot antenna formed by cutting out a conductive film; and
   a power supply unit configured to supply power to the slot antenna,
   wherein the slot antenna includes
   a first slot extending in a first direction;
   a second slot connected to one end of the first slot, and extending in a second direction that is different from the first direction,
   a first wide-width slot connected to the other end of the first slot directly or via a first connection slot, and having a slot width that is greater than a slot width of the first slot, and
   a second wide-width slot connected to a terminal end portion of the second slot directly or via a second connection slot, and having a slot width that is greater than a slot width of the second slot, and
   wherein the power supply unit is arranged so as to straddle the first slot.

2. The glass antenna according to claim 1,
   wherein the first direction in which the first slot extends is an approximately up-down direction on a surface of the vehicle window glass.

3. The glass antenna according to claim 1,
   wherein the second direction in which the second slot extends is an approximately horizontal direction on a surface of the vehicle window glass.

4. The glass antenna according to claim 1,
   wherein when the vehicle window glass is installed in an opening of a vehicle chassis, the glass antenna is located at a position near a corner portion between a lower edge portion of the opening and a side edge portion of the opening connected to the lower edge portion.

5. The glass antenna according to claim 4,
   wherein the first wide-width slot and the second wide-width slot open in directions away from the corner portion near to which the glass antenna is arranged, respectively,
   wherein a part of the conductive film arranged closer to the corner portion, near to which the glass antenna is arranged, with respect to the second slot and the first slot functions as a ground side conductive body, and a part of the conductive film arranged farther from the corner portion, near to which the glass antenna is arranged, with respect to the second slot and the first slot functions as a core wire side conductive body, and
   wherein the power supply unit, which is arranged so as to straddle the first slot, supply power to the ground side conductive body and the core wire side conductive body.

6. The glass antenna according to claim 5,
   wherein the second wide-width slot opens upward, and
   wherein a resistor is arranged so as to be connected to the conductive film, straddling the opening of the second wide-width slot.

7. The glass antenna according to claim 1,
   wherein to the other end of the first slot, the first wide-width slot is connected via the first connection slot, wherein the first connection slot extends in a third direction that is different from the first direction in which the first slot extends, and wherein the slot width of the first wide-width slot is greater than a slot width of the first connection slot.

8. The glass antenna according to claim 7, wherein the third direction in which the first connection slot extends is approximately parallel to the second direction.

9. The glass antenna according to claim 7, wherein a slot length of the first connection slot is shorter than a slot length of the second slot, wherein the first wide-width slot connected to the first connection slot is arranged between the first slot and the second wide-width slot in the second direction, and wherein the conductive film has a rectangular shape.

10. The glass antenna according to claim 1, wherein at least one of the slot width of the first wide-width slot and the slot width of the second wide-width slot increase gradually or increase in a step-by-step manner as the slots extend.

11. The glass antenna according to claim 4, wherein the first wide-width slot opens in a direction facing the side edge portion of the opening of the vehicle chassis, and the second wide-width slot opens upward in a direction away from the lower edge portion of the opening, wherein a part of the conductive film arranged lower than the second slot functions as a ground state conductive body, and a part of the conductive film arranged higher than the second slot functions as a core wire side conductive body, and wherein the power supply unit, which is arranged so as to straddle the first slot, supply power to the ground side conductive body and the core wire side conductive body.

12. The glass antenna according to claim 11, wherein a part of the core wire side conductive body protrudes towards the side edge portion of the opening with respect to the ground side conductive body.

13. The glass antenna according to claim 11, wherein the second wide-width slot includes a constricted portion, in which a slot width is partially narrowed, between a part at which the second wide-width slot is connected to the second slot or the second connection slot and a part at which the second wide-width slot opens upward, and wherein the slot width of the second wide-width slot increases gradually or in a step-by-step manner from the constricted portion toward the part at which the second wide-width slot opens upward.

14. The glass antenna according to claim 11, wherein a resistor is arranged so as to be connected to the conductive film, straddling the second slot.

15. The glass antenna according to claim 11, wherein to the terminal end portion of the second slot, the second wide-width slot is connected via the second connection slot, wherein the second connection slot extends in a fourth direction that is different from the second direction in which the second slot extends, and wherein the slot width of the second wide-width slot is greater than a slot width of the second connection slot.

16. The glass antenna according to claim 15, wherein a resistor is arranged so as to be connected to the conductive film, straddling the second connection slot.

17. The glass antenna according to claim 15, wherein the fourth direction in which the second connection slot extends is approximately parallel to the first direction.

18. The glass antenna according to claim 1, wherein a cutout portion is formed in the conductive film so as not to contact each of the slots, a size of the cutout portion being less than the slot length of each of the slots.

19. The glass antenna according to claim 1, wherein the glass antenna can transmit/receive a communication wave over frequency bands of 0.698 GHz to 0.96 GHz, 1.710 GHz to 2.17 GHz, and 2.4 GHz to 2.69 GHz.

20. A vehicle window glass provided with the glass antenna according to claim 1.

* * * * *